US009622321B2

(12) United States Patent
Creasman et al.

(10) Patent No.: US 9,622,321 B2
(45) Date of Patent: Apr. 11, 2017

(54) SYSTEMS, DEVICES AND METHODS FOR CONTROLLING ONE OR MORE LIGHTS

(71) Applicant: Cree, Inc., Durham, NC (US)

(72) Inventors: Ethan Timothy Creasman, Morrisville, NC (US); Nathan Snell, Raleigh, NC (US); Spencer Pratt, Cary, NC (US); Shawn Leroux Heeter, Morrisville, NC (US)

(73) Assignee: Cree, Inc., Durham, NC (US)

( * ) Notice: Subject to any disclaimer, the term of this patent is extended or adjusted under 35 U.S.C. 154(b) by 133 days.

(21) Appl. No.: 14/052,336

(22) Filed: Oct. 11, 2013

(65) Prior Publication Data
US 2015/0102729 A1    Apr. 16, 2015

(51) Int. Cl.
  *H05B 37/02* (2006.01)
  *G01J 1/42* (2006.01)
  *G01J 1/02* (2006.01)
  *G01J 1/04* (2006.01)

(52) U.S. Cl.
  CPC ........ *H05B 37/0218* (2013.01); *G01J 1/0219* (2013.01); *G01J 1/0271* (2013.01); *G01J 1/0403* (2013.01); *G01J 1/0411* (2013.01); *G01J 1/0488* (2013.01); *G01J 1/4204* (2013.01); *Y02B 20/46* (2013.01)

(58) Field of Classification Search
  CPC ............ H05B 37/0272; H05B 37/0218; H05B 37/0227; H05B 37/02; H05B 33/0803;
  (Continued)

(56) References Cited

U.S. PATENT DOCUMENTS

D224,621 S    8/1972  Kahn
D255,031 S    5/1980  Lazzara
(Continued)

FOREIGN PATENT DOCUMENTS

AT    492840 T    1/2011
AU    3666702 A   5/2002
(Continued)

OTHER PUBLICATIONS

Teasdale, Dana et al., "Annual Technical Progress Report: Adapting Wireless Technology to Lighting Control and Environmental Sensing," Dust Networks, Aug. 1, 2004, 41 pages.
(Continued)

*Primary Examiner* — Alexander H Taningco
*Assistant Examiner* — Seokjin Kim
(74) *Attorney, Agent, or Firm* — Jenkins, Wilson, Taylor & Hunt, P.A.

(57) ABSTRACT

Systems, devices and methods for controlling one or more lights are disclosed. In some aspects, systems for controlling one or more lights can include an interface and a remote sensing device that is separate from and is in electrical communication with the interface. The remote sensing device can additionally include at least one sensor, for example an ambient light sensor. Each of the remote sensing device and the interface can be configured to attach to support structures via retaining features. In one aspect, the remote sensing device can include a first and a second retaining member that rotatably thread onto a main body of the sensing device and adjust according to the thickness and structure of the support structure. In another aspect, the interface can include a retention feature utilizing flexible tabs with integrated detents to accommodate variable sizes of openings of the support structure.

15 Claims, 23 Drawing Sheets

(58) Field of Classification Search
CPC ............ H05B 33/0842; H05B 33/0854; H05B 33/0845; H05B 33/0869; H05B 33/0806; H05B 33/0824; H05B 33/0848; H05B 37/034; H05B 33/08; H05B 33/0896; H05B 39/041; F21V 23/0464; F21V 23/0471; F21V 23/0442; F21V 23/0457; F21V 15/01; F21V 15/013; F21V 15/015; F21V 19/0045; F21V 21/02; F21V 21/112; F21V 23/002; F21V 23/007
USPC ................. 315/119–136, 149–159; 250/216; 178/40–507, 520–565; 362/145–208, 362/362–374, 382–458
See application file for complete search history.

(56) References Cited

U.S. PATENT DOCUMENTS

| | | |
|---|---|---|
| D259,514 S | 6/1981 | Welch |
| 4,839,533 A | 6/1989 | Aga |
| D317,363 S | 6/1991 | Welch |
| 5,079,680 A | 1/1992 | Kohn |
| D333,294 S | 2/1993 | Dossey |
| D344,361 S | 2/1994 | Friedman et al. |
| D349,582 S | 8/1994 | Bain et al. |
| 5,471,119 A | 11/1995 | Ranganath et al. |
| 5,486,984 A * | 1/1996 | Miller .................. G02B 6/0008 362/147 |
| D373,438 S | 9/1996 | McCann-Compton et al. |
| D419,964 S | 2/2000 | Holce et al. |
| 6,118,230 A | 9/2000 | Fleischmann |
| 6,137,408 A | 10/2000 | Okada |
| 6,160,359 A | 12/2000 | Fleischmann |
| 6,166,496 A | 12/2000 | Lys et al. |
| 6,396,040 B1 | 5/2002 | Hill |
| 6,437,692 B1 | 8/2002 | Petite et al. |
| 6,528,954 B1 | 3/2003 | Lys et al. |
| 6,553,218 B1 | 4/2003 | Boesjes |
| 6,735,630 B1 | 5/2004 | Gelvin et al. |
| 6,804,790 B2 | 10/2004 | Rhee et al. |
| 6,826,607 B1 | 11/2004 | Gelvin et al. |
| 6,832,251 B1 | 12/2004 | Gelvin et al. |
| 6,859,831 B1 | 2/2005 | Gelvin et al. |
| 6,914,893 B2 | 7/2005 | Petite |
| 6,975,851 B2 | 12/2005 | Boesjes |
| 6,990,394 B2 | 1/2006 | Pasternak |
| 7,005,802 B2 | 2/2006 | Myron et al. |
| 7,020,701 B1 | 3/2006 | Gelvin et al. |
| 7,031,920 B2 | 4/2006 | Dowling et al. |
| 7,093,431 B2 | 8/2006 | Balle et al. |
| 7,095,056 B2 | 8/2006 | Vitta et al. |
| 7,103,511 B2 | 9/2006 | Petite |
| D549,663 S | 8/2007 | Tsou et al. |
| 7,272,027 B2 | 9/2007 | Pereira et al. |
| 7,305,467 B2 | 12/2007 | Kaiser et al. |
| 7,313,399 B2 | 12/2007 | Rhee et al. |
| D560,006 S | 1/2008 | Garner et al. |
| 7,330,115 B1 | 2/2008 | Zuba |
| 7,333,903 B2 | 2/2008 | Walters et al. |
| 7,344,279 B2 | 3/2008 | Mueller et al. |
| D565,771 S | 4/2008 | Garner et al. |
| D567,431 S | 4/2008 | Garner et al. |
| 7,357,530 B2 | 4/2008 | Wang et al. |
| 7,369,060 B2 | 5/2008 | Veskovic et al. |
| D580,886 S | 11/2008 | Harman |
| D582,598 S | 12/2008 | Kramer et al. |
| 7,468,661 B2 | 12/2008 | Petite et al. |
| 7,482,567 B2 | 1/2009 | Hoelen et al. |
| 7,484,008 B1 | 1/2009 | Gelvin et al. |
| D586,950 S | 2/2009 | Garner et al. |
| D587,390 S | 2/2009 | Garner et al. |
| D588,064 S | 3/2009 | Garner et al. |
| 7,522,563 B2 | 4/2009 | Rhee |
| 7,550,931 B2 | 6/2009 | Lys et al. |
| 7,606,572 B2 | 10/2009 | Rhee et al. |
| 7,646,029 B2 | 1/2010 | Mueller et al. |
| 7,657,249 B2 | 2/2010 | Boesjes |
| 7,683,301 B2 | 3/2010 | Papamichael et al. |
| 7,697,492 B2 | 4/2010 | Petite |
| 7,797,367 B1 | 9/2010 | Gelvin et al. |
| 7,804,252 B2 | 9/2010 | Chen |
| 7,839,017 B2 | 11/2010 | Huizenga et al. |
| 7,844,308 B2 | 11/2010 | Rhee et al. |
| 7,844,687 B1 | 11/2010 | Gelvin et al. |
| 7,891,004 B1 | 2/2011 | Gelvin et al. |
| 7,904,569 B1 | 3/2011 | Gelvin et al. |
| 7,924,174 B1 | 4/2011 | Gananathan |
| 7,924,927 B1 | 4/2011 | Boesjes |
| 7,948,930 B2 | 5/2011 | Rhee |
| 8,021,021 B2 | 9/2011 | Paolini |
| 8,035,320 B2 | 10/2011 | Sibert |
| 8,079,118 B2 | 12/2011 | Gelvin et al. |
| 8,098,615 B2 | 1/2012 | Rhee |
| 8,126,429 B2 | 2/2012 | Boesjes |
| 8,140,658 B1 | 3/2012 | Gelvin et al. |
| 8,159,156 B2 | 4/2012 | Henig et al. |
| 8,226,272 B2 | 7/2012 | Chen |
| 8,228,163 B2 | 7/2012 | Cash et al. |
| 8,249,462 B2 | 8/2012 | Budde et al. |
| 8,255,487 B2 | 8/2012 | Valois |
| 8,264,172 B2 | 9/2012 | Valois et al. |
| 8,271,058 B2 | 9/2012 | Rhee et al. |
| 8,274,928 B2 | 9/2012 | Dykema et al. |
| 8,275,471 B2 | 9/2012 | Huizenga et al. |
| 8,280,558 B2 | 10/2012 | Picco |
| 8,315,237 B2 | 11/2012 | Berger et al. |
| 8,324,838 B2 | 12/2012 | Shah et al. |
| 8,344,660 B2 | 1/2013 | Mohan et al. |
| 8,364,325 B2 | 1/2013 | Huizenga et al. |
| 8,445,826 B2 | 5/2013 | Verfuerth |
| 8,450,670 B2 | 5/2013 | Verfuerth et al. |
| 8,469,547 B2 | 6/2013 | Paolini |
| 8,497,634 B2 | 7/2013 | Scharf |
| 8,508,137 B2 | 8/2013 | Reed |
| 8,519,714 B2 | 8/2013 | Harbers |
| 8,536,792 B1 | 9/2013 | Roosli |
| 8,536,802 B2 | 9/2013 | Chemel et al. |
| 8,536,984 B2 | 9/2013 | Benetz et al. |
| 8,547,036 B2 | 10/2013 | Tran |
| 8,564,215 B2 | 10/2013 | Okawa et al. |
| 8,587,223 B2 | 11/2013 | Ilyes et al. |
| 8,587,225 B2 | 11/2013 | Ashar et al. |
| 8,598,791 B2 | 12/2013 | Liao |
| 8,601,595 B2 | 12/2013 | Gelvin et al. |
| 8,604,714 B2 | 12/2013 | Mohan et al. |
| 8,626,318 B2 | 1/2014 | Wu |
| 8,641,241 B2 | 2/2014 | Farmer |
| 8,660,121 B2 | 2/2014 | McCormack |
| 8,664,864 B2 | 3/2014 | Salsbury |
| 8,674,625 B2 | 3/2014 | So |
| 8,680,787 B2 | 3/2014 | Veskovic |
| 8,710,770 B2 | 4/2014 | Woytowitz |
| 8,710,772 B2 | 4/2014 | Henig et al. |
| 8,777,453 B2 | 7/2014 | Donegan |
| 8,810,137 B2 | 8/2014 | Dahlen et al. |
| 8,812,654 B2 | 8/2014 | Gelvin et al. |
| 8,821,182 B2 | 9/2014 | Hayman et al. |
| 8,832,244 B2 | 9/2014 | Gelvin et al. |
| 8,836,503 B2 | 9/2014 | Gelvin et al. |
| 8,866,408 B2 | 10/2014 | Chemel et al. |
| 8,890,435 B2 | 11/2014 | Bora et al. |
| 8,902,076 B2 | 12/2014 | Pederson et al. |
| 8,922,570 B2 | 12/2014 | Archer |
| 8,946,996 B2 | 2/2015 | Ivey et al. |
| 8,952,631 B2 | 2/2015 | Simonian et al. |
| 8,975,827 B2 | 3/2015 | Chobot et al. |
| 8,994,295 B2 | 3/2015 | Mohan et al. |
| 9,006,995 B2 | 4/2015 | Pereira et al. |
| 9,006,996 B2 | 4/2015 | Mohan et al. |
| 9,028,094 B2 | 5/2015 | Paolini |
| 9,066,404 B2 | 6/2015 | Paolini et al. |
| 9,080,758 B2 | 7/2015 | Igaki et al. |
| 9,088,964 B2 | 7/2015 | Boesjes |
| D739,359 S | 9/2015 | Creasman |

(56) References Cited

U.S. PATENT DOCUMENTS

| | | |
|---|---|---|
| 2004/0002792 A1 | 1/2004 | Hoffknecht |
| 2005/0132080 A1 | 6/2005 | Rhee et al. |
| 2006/0044152 A1 | 3/2006 | Wang |
| 2006/0181416 A1 | 8/2006 | Chen |
| 2007/0132405 A1 | 6/2007 | Hillis et al. |
| 2008/0031213 A1 | 2/2008 | Kaiser et al. |
| 2009/0302994 A1 | 12/2009 | Rhee et al. |
| 2009/0302996 A1 | 12/2009 | Rhee et al. |
| 2009/0305644 A1 | 12/2009 | Rhee et al. |
| 2009/0315668 A1 | 12/2009 | Leete, III et al. |
| 2010/0084992 A1 | 4/2010 | Valois et al. |
| 2010/0128634 A1 | 5/2010 | Rhee et al. |
| 2010/0203515 A1 | 8/2010 | Rigler |
| 2010/0294915 A1 | 11/2010 | Williams et al. |
| 2011/0298598 A1 | 12/2011 | Rhee |
| 2012/0013257 A1 | 1/2012 | Sibert |
| 2012/0087290 A1 | 4/2012 | Rhee et al. |
| 2012/0136485 A1 | 5/2012 | Weber et al. |
| 2012/0139426 A1 | 6/2012 | Ilyes et al. |
| 2012/0147808 A1 | 6/2012 | Rhee |
| 2012/0175494 A1 | 7/2012 | Williams et al. |
| 2012/0206050 A1 | 8/2012 | Spero |
| 2012/0235579 A1 | 9/2012 | Chemel et al. |
| 2012/0313533 A1 | 12/2012 | Hu |
| 2013/0013091 A1 | 1/2013 | Cavalcanti et al. |
| 2013/0021792 A1 | 1/2013 | Snell et al. |
| 2013/0075484 A1 | 3/2013 | Rhee et al. |
| 2013/0200805 A1 | 8/2013 | Scapa et al. |
| 2013/0207552 A1* | 8/2013 | Plunk .................. F21S 8/02 315/152 |
| 2013/0207553 A1 | 8/2013 | Biery et al. |
| 2013/0210252 A1 | 8/2013 | Ilyes |
| 2013/0271011 A1 | 10/2013 | Williams et al. |
| 2013/0342911 A1 | 12/2013 | Bartol et al. |
| 2014/0001952 A1 | 1/2014 | Harris et al. |
| 2014/0001959 A1 | 1/2014 | Motley et al. |
| 2014/0001962 A1 | 1/2014 | Harris |
| 2014/0001963 A1 | 1/2014 | Chobot et al. |
| 2014/0001972 A1 | 1/2014 | Harris et al. |
| 2014/0001977 A1 | 1/2014 | Zacharchuck et al. |
| 2014/0191661 A1 | 7/2014 | Riggs |
| 2014/0217903 A1 | 8/2014 | Platner et al. |
| 2014/0268790 A1 | 9/2014 | Chobot et al. |
| 2014/0354150 A1* | 12/2014 | Joseph ............... H05B 33/0872 315/51 |

FOREIGN PATENT DOCUMENTS

| | | |
|---|---|---|
| AU | 2002219810 A8 | 5/2002 |
| AU | 2002352922 A1 | 6/2003 |
| CA | 2426769 A1 | 5/2002 |
| CA | 2511368 A1 | 5/2002 |
| CN | 101461151 A | 6/2009 |
| CN | 102119507 A | 7/2011 |
| DE | 60143707 | 2/2011 |
| EP | 1330699 A1 | 7/2003 |
| EP | 1334608 A2 | 8/2003 |
| EP | 1461907 A1 | 9/2004 |
| EP | 1719363 A2 | 11/2006 |
| EP | 1886415 A2 | 2/2008 |
| EP | 2304311 A1 | 4/2011 |
| EP | 2327184 A1 | 6/2011 |
| EP | 2440017 A2 | 4/2012 |
| HK | 1114508 A | 10/2008 |
| IN | 4576KOLNP2007 | 7/2008 |
| JP | H11345690 A | 12/1999 |
| JP | 2005510956 A | 4/2005 |
| JP | 3860116 B2 | 12/2006 |
| JP | 3896573 B2 | 3/2007 |
| JP | 2011526414 A | 10/2011 |
| KR | 20080025095 A | 3/2008 |
| WO | WO 01/26068 A1 | 4/2001 |
| WO | WO 01/26327 A2 | 4/2001 |
| WO | WO 01/26328 A2 | 4/2001 |
| WO | WO 01/26329 A2 | 4/2001 |
| WO | WO 01/26331 A2 | 4/2001 |
| WO | WO 01/26332 A2 | 4/2001 |
| WO | WO 01/26333 A2 | 4/2001 |
| WO | WO 01/26334 A2 | 4/2001 |
| WO | WO 01/26335 A2 | 4/2001 |
| WO | WO 01/26338 A2 | 4/2001 |
| WO | WO 02/39242 A1 | 5/2002 |
| WO | WO 02/41604 A2 | 5/2002 |
| WO | WO 03/047175 A1 | 6/2003 |
| WO | WO 2004/109966 A2 | 12/2004 |
| WO | WO 2006/130662 A2 | 12/2006 |
| WO | WO 2007/102097 A1 | 9/2007 |
| WO | WO 2009/011898 A2 | 1/2009 |
| WO | WO 2009/145747 A1 | 12/2009 |
| WO | WO 2009/151416 A1 | 12/2009 |
| WO | WO 2009/158514 A1 | 12/2009 |
| WO | WO 2010/122457 A2 | 10/2010 |
| WO | WO 2011/070058 A2 | 6/2011 |
| WO | WO 2011/087681 A1 | 7/2011 |
| WO | WO 2011/090938 A1 | 7/2011 |
| WO | WO 2011/152968 A1 | 12/2011 |
| WO | WO 2012/112813 A2 | 8/2012 |
| WO | WO 2012/125502 A2 | 9/2012 |

OTHER PUBLICATIONS

Kuhn. Fabian et al., "Initializing Newly Deployed Ad Hoc & Sensor Networks", The Tenth Annual International Conference on Mobile Computing and Networking (MobiCom '04), Sep. 26-Oct. 4, 2004, 15 pages, Philadelphia, PA.

Author Unknown, "Controlling LEOs," Lutron Electronics Co., Inc., Jan. 1, 2011, 16 pages.

Harris, Michael, "Modular Lighting Control", U.S. Appl. No. 13/589,399, filed Aug. 20, 2012, 54 pages.

Harris, Michael, "Lighting Component with Independent DC-DC Converters", U.S. Appl. No. 13/606,713, filed Sep. 7, 2012, 42 pages.

Randolph, David, et al., "Lighting Fixture", U.S. Appl. No. 13/649,531, filed Oct. 11, 2012, 60 pages.

Technical Publications Department at Creston, "Creston Green Light Commercial Lighting Design Guide," Creston Electronics, Inc., 2013, 74 pages.

Author Unknown, "Section 16950: Distributed Digital Lighting Control System," Lighting Control Devices, Apr. 30, 2013, 20 pages.

Non-Final Office Action for U.S. Appl. No. 13/782,131, mailed May 28, 2013, 10 pages.

Author Unknown, "Cluster Analysis", Wikipedia—the free encyclopedia, Updated May 21, 2013, Retrieved on May 30, 2013, http://en.wikipedia.org/wiki/cluster_analysis, 16 pages.

Author Unknown, "Multi-Agent System", Wikipedia—the free encyclopedia, Updated Apr. 18, 2013, Retrieved May 30, 2013, http://en.wikipedia.org/wiki/multi-agent_system, 7 pages.

Author Unknown, i2C-Bus: What's That?, Updated 2012, Retrieved May 30, 2013, http://www.i2c-bus.org, 1 page.

Non-Final Office Action for U.S. Appl. No. 13/782,096, mailed Jun. 10, 2013, 12 pages.

Quayle Action for U.S. Appl. No. 13/782,078, mailed Jun. 12, 2013, 4 pages.

Non-Final Office Action for U.S. Appl. No. 13/782,068, mailed Jul. 16, 2013, 6 pages.

Author Unknown. "System Design Guide—Lighting Control & Design: System Overview," Lighting Control and /MA/ Design, Form No. 1382.057, Accessed Aug. 9, 2013, 4 pages.

Author Unknown, "The System: Components," Simply5, Accessed: Aug. 9, 2013, 2 pages, http://simply5.net/ how.html.

Author Unknown, "System Overview & Introduction," nLight Network Lighting Controls, Accessed: Aug. 9, 2013, 4 pages, http://nlightcontrols.com/lighting-controls/overview.

Notice of Allowance for U.S. Appl. No. 13/782,078, mailed Sep. 16, 2013, 7 pages.

International Search Report and Written Opinion for PCT/US2013/047608, mailed Sep. 25, 2013, 11 pages.

(56) References Cited

OTHER PUBLICATIONS

Supplemental Notice of Allowability for U.S. Appl. No. 13/782,078, mailed Sep. 27, 2013, 2 pages.
International Search Report and Written Opinion for PCT/US2013/047602, mailed Oct. 11, 2013, 13 pages.
Notice of Allowance for U.S. Appl. No. 13/782,068, mailed Oct. 22, 2013, 9 pages.
Non-Final Office Action for U.S. Appl. No. 13/782,131, mailed Nov. 6, 2013, 9 pages.
Non-Final Office Action for U.S. Appl. No. 13/782,068, mailed Nov. 15, 2013, 5 pages.
Final Office Action for U.S. Appl. No. 13/782,096, mailed Nov. 18, 2013, 15 pages.
Advisory Action for U.S. Appl. No. 13/782,096, mailed Jan. 27, 2014, 3 pages.
Notice of Allowance for U.S. Appl. No. 13/782,131, mailed Feb. 20, 2014, 9 pages.
International Search Report and Written Opinion for International Application PCT/US2013/075729, mailed Apr. 29, 2014, 8 pages.
Non-Final Office Action for U.S. Appl. No. 13/719,786, mailed Mar. 6, 2014, 12 pages.
Final Office Action for U.S. Appl. No. 13/782,068, mailed Mar. 7, 2014, 7 pages.
International Search Report and Written Opinion for PCT/US2013/075723, mailed May 9, 2014, 8 pages.
International Search Report and Written Opinion for PCT/US2013/075748, mailed May 9, 2014, 7 pages.
Notice of Allowance for U.S. Appl. No. 13/782,068, mailed May 12, 2014, 7 pages.
Invitation to Pay Additional Fees and Partial International Search for PCT/US2013/075737, mailed May 13, 2014, 5 pages.
Invitation to Pay Additional Fees and Partial International Search for PCT/US2013/075742, mailed May 14, 2014, 6 pages.
International Search Report and Written Opinion for PCT/US2013/075754, mailed May 15, 2014, 8 pages.
International Search Report and Written Opinion for PCT/US2013/075761, mailed May 15, 2014, 7 pages.
Notice of Allowance for U.S. Appl. No. 13/782,131, mailed Jun. 5, 2014, 5 pages.
Invitation to Pay Additional Fees and Partial International Search Report for PCT/US2013/075777, mailed Jun. 5, 2014, 6 pages.
Non-Final Office Action for U.S. Appl. No. 13/589,928, mailed Jun. 11, 2014, 17 pages.
Examiner's Answer to the Appeal Brief for U.S. Appl. No. 13/782,096, mailed Jul. 7, 2014, 17 pages.
Final Office Action for U.S. Appl. No. 13/719,786, mailed Jul. 29, 2014, 14 pages.
International Search Report and Written Opinion for PCT/US2013/075777, mailed Aug. 12, 2014, 14 pages.
Non-Final Office Action for U.S. Appl. No. 13/782,068, mailed Aug. 15, 2014, 6 pages.
International Search Report and Written Opinion for PCT/US2013/075737, mailed Aug. 27, 2014, 11 pages.
International Search Report and Written Opinion for PCT/US2013/075742, mailed Aug. 27, 2014, 11 pages.
Notice of Allowance for U.S. Appl. No. 13/782,131, mailed Oct. 28, 2014, 5 pages.
Non-Final Office Action for U.S. Appl. No. 13/782,022, mailed Nov. 14, 2014, 14 pages.
Non-Final Office Action for U.S. Appl. No. 13/782,053, mailed Nov. 14, 2014, 11 pages.
Non-Final Office Action for U.S. Appl. No. 13/719,786, mailed Nov. 20, 2014, 16 pages.
Requirement for Restriction/ Election for U.S. Appl. No. 29/452,813, mailed Nov. 21, 2014, 7 pages.
Non-Final Office Action for U.S. Appl. No. 13/589,899 dated Apr. 20, 2015.
Notice of Allowance for U.S. Appl. No. 29/469,626 dated May 21, 2015.
Notice of Allowance for U.S. Appl. No. 29/469,626 dated Jul. 8, 2015.
Restriction Requirement for U.S. Appl. No. 29/469,626 dated Mar. 5, 2015.

* cited by examiner

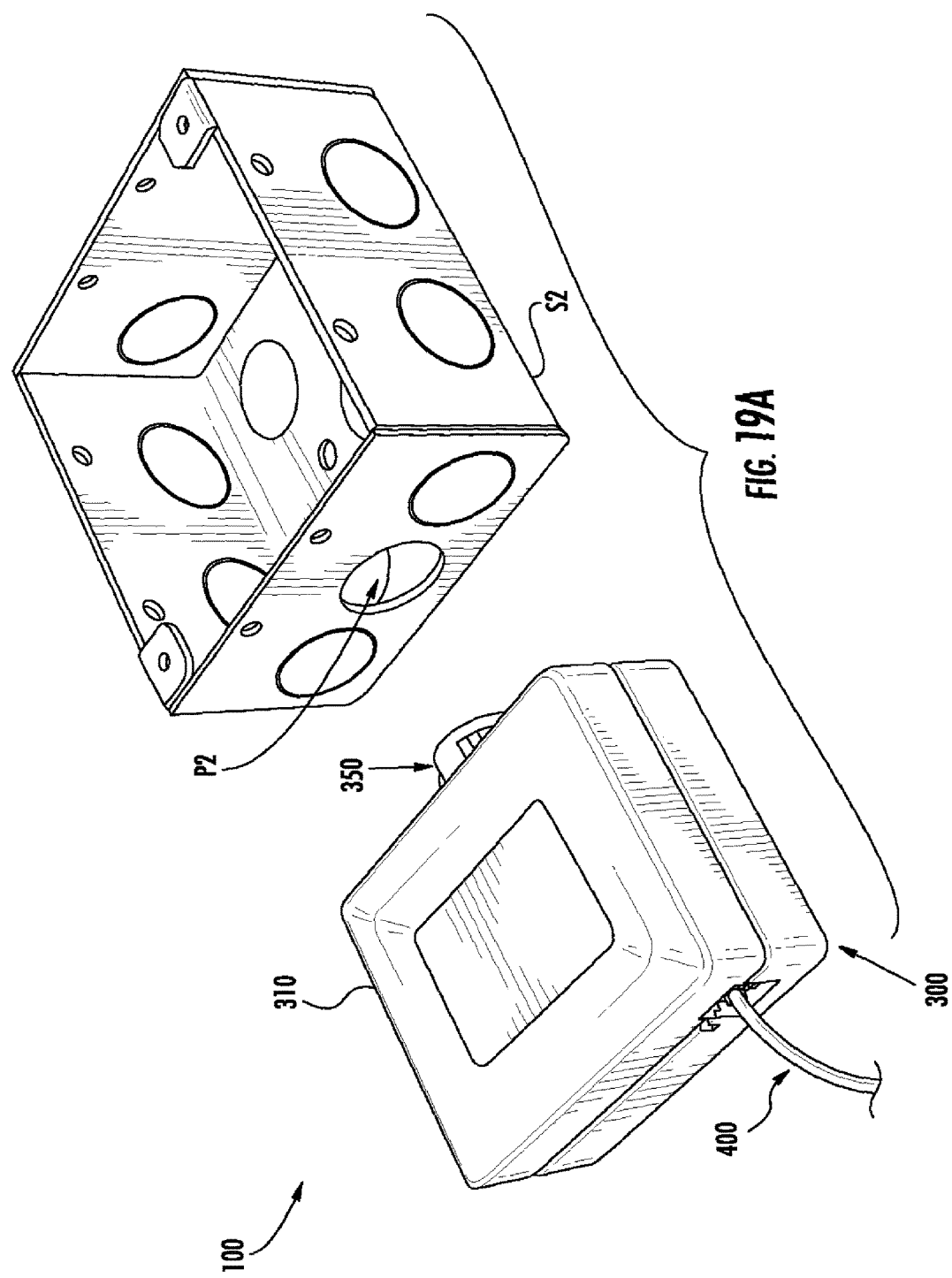

SYSTEMS, DEVICES AND METHODS FOR CONTROLLING ONE OR MORE LIGHTS

TECHNICAL FIELD

The subject matter disclosed herein relates generally to lighting controls for controlling one or more lights. More particularly, the subject matter disclosed herein relates to light fixture control systems having improved installation at a lower cost.

BACKGROUND

Smart lighting has gained traction to replace typical lighting solutions in residential, commercial, and industrial applications. Compared to typical lighting solutions, smart lighting can save electricity, provide more natural and/or even lighting, and improve efficiency. For example, a smart lighting system with an occupancy sensor can turn the lights on when someone enters a room, turn them off when that person leaves, and reduce the lighting output near sources of natural light, such as windows.

However, the complete replacement of all current lighting systems would be costly and wasteful. Thus, ways to integrate smart lighting systems into previously installed, traditional lighting systems are currently being developed. Traditional lighting systems that utilize dimming controls provide an additional level of complexity with regard to the integration of smart lighting devices. As a result, smart lighting must be able to accommodate a full range of support structures, such as ceilings, ceiling tiles and walls, while also connecting to other previously installed lighting controls. Yet, many add-on systems that are currently for sale cannot accommodate a wide range of ceiling and wall thicknesses. Moreover, these products typically require additional hardware for attachment to such support structures. Consequently, there is a need for a system for controlling one or more lights, which can accommodate a wide range of mounting solutions.

SUMMARY

In accordance with this disclosure, novel systems, devices and methods for controlling one or more lights are provided and described therein. It is, therefore, an object of the disclosure herein to provide exemplary systems, devices and methods that can include a sensing device and an interface for installing and/or integrating a novel lighting control system into support structures and/or previously installed, traditional lighting systems.

In one aspect, the present subject matter provides a system for controlling one or more lights, which can include an interface, and a remote sensing device separate from and in electrical communication with the interface, wherein the remote sensing device can be configured for attachment to a first support structure and can include at least an ambient light sensor.

In another aspect, the present subject matter provides at least one remote sensing device in electrical communication with an interface and configured for attachment to a first support structure, which can include a substantially cylindrical main body, an ambient light sensor coupled to the substantially cylindrical main body, a first retaining member disposed on a first end of the main body, and a second retaining member disposed on a second end of the main body, and wherein the first retaining member and the second retaining member are adjustable with respect to the main body.

In another aspect, the present subject matter provides an enclosure configured to be in communication with a sensing device, and a retention feature attached to an external face of the enclosure and configured for attachment to a second support structure, wherein the retention feature can comprise a substantially cylindrical body with at least one flexible tab radially angled off of a top portion of the substantially cylindrical body.

In another aspect, a method for controlling one or more lights using a remote sensing device is provided. The method can include, securing the remote sensing device in a first support structure by inserting the substantially cylindrical main body through an opening in the first support structure and then rotatably threading onto the first end and the second end of the substantially cylindrical main body of the sensing device the first retaining member and the second retaining member, respectively, such that a surface of each of the first retaining member and the second retaining member abut the first support structure on opposing sides, coupling an interface in electrical communication with one or more lights to a second support structure by applying pressure to at least one flexible tab so that the pressure displaces the at least one flexible tab with respect to an original resting position, such that the retention feature fits within an opening in the second support structure, and processing the information from the remote sensing device in order to control the one or more lights.

Although some of the aspects of the subject matter disclosed herein have been stated hereinabove, and which are achieved in whole or part by the presently disclosed subject matter, other aspects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

Figure 1:
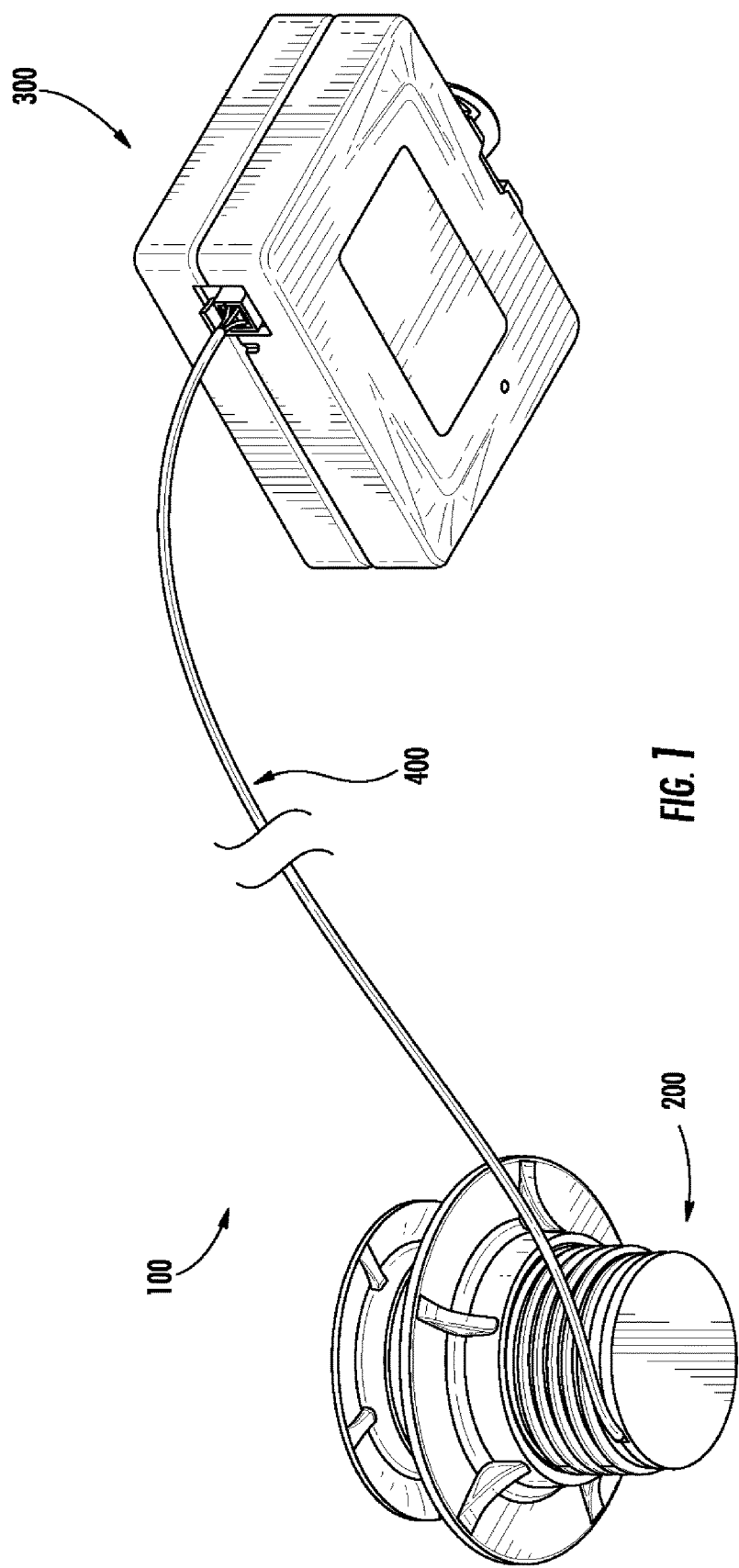
FIG. 1 is a bottom perspective view of a system for controlling one or more lights according to an embodiment of the subject matter described herein.

Example embodiments will now be described with reference to FIGS. 1-22. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that relative terms such as "front," "forward," "rear," "below," "above," "upper," "lower," "horizontal," or "vertical" can be used herein to describe a relationship of one element or region to another element or region as illustrated in the figures. It will be understood that these terms are intended to encompass different orientations of the device in addition to the orientation depicted in the figures.

The present disclosure relates to a system for controlling one or more lights utilizing at least an ambient light sensor. The system can comprise two parts: a sensing device and an interface. The sensing device and the interface can be configured for attachment to separate supporting structures. The interface and the sensing device can be in electronic communication with each other via wired or wireless means. The system can also be in electronic communication with said one or more lights, via wired or wireless means. The system can process data generated by the sensing device or can pass the data unprocessed onto one or more lights. The system can also be integrated into a lighting control system, which comprises one or more light fixtures or systems, or it can function on its own.

Reference is made to co-pending and co-assigned U.S. patent applications Ser. Nos. 13/838,398 and 13/782,040, the contents of which are incorporated herein by reference in their entireties.

In general, a system in accordance with the present disclosure is designed to control one or more lights and to securely attach to at least one supporting structure. In most applications, the system can control one or more lights, but can also share and receive information with other light fixtures, sensors, or systems. For example, the system can interface with other electronics (e.g. a dimming control system) in order to gather daylight and occupancy information. The presently disclosed system can be employed as part of a network of similar systems or can be used on its own. In one aspect, there can be multiple systems, each with one or more sensors. The multiple systems can be in communication with one another to process the sensor data and/or control input in a cooperative manner or can operate separately based on the sensor data and/or control input. Regardless of whether the system is part of a network of similar systems or is used on its own, the system can be strategically installed in the room to be lighted in order to enhance the system's lighting control options. In one aspect, the system can be operable based on external, environmental factors. For example, where the system is installed near entryways, windows, doors, etc., the system can be programmed to turn the lights on when someone enters a room, turn them off when that person leaves, and reduce the lighting output near sources of natural light, such as windows. Where multiple systems with one or more sensors are placed throughout a room, each system can process sensor data provided by its own sensor, a similar system, or a lighting fixture, and process the sensor data according to the system's own internal logic to control operation of the one or more lights. Alternatively, each system can also receive control input from other systems, lighting fixtures, control nodes, light switches, and/or commissioning tools. The control input can be processed along with the sensor data, according to the internal logic, to further enhance the system's control of one or more lights.

Various physical aspects of the system 100 are illustrated in FIGS. 1-22 and described below. In FIG. 1, a system 100 can comprise an interface 300 and a sensing device 200. The sensing device 200 and the interface 300 can be in electrical communication with each other, by either wired or wireless means. In one aspect, the interface 300 and the sensing device 200 can be in electrical connection via cable 400. Cable 400 can be any suitable cable that provides electric connectivity, such as, but not limited to a RJ45, RJ25, or RJ14 cable. In a further aspect, system 100 can comprise an interface 300 and more than one sensing device 200. For example, in FIG. 22, three sensing devices 200 are contemplated, but any number of sensing devices 200 can be suitable. The sensing devices 200 and the interface 300 can be in electrical communication with each other, by either wired or wireless means, such as cable 400.

The sensing device 200 can comprise a main body 240, an inner body 230, a first retaining member (or faceplate) 210, and a second retaining member (or main screw) 220, which can be coaxially aligned. The sensing device 200 and any or all sub-components can be composed of any suitable material, such as, but not limited to, plastic, metal, organic material, or a combination of such, and can be created with any suitable technique, such as forming, molding, or machining.

In one aspect, the main body 240 is at least substantially cylindrical, but can be any shape and/or substantially hollow. The main body 240 can comprise a first end 250 and a second end 252 distal to the first end 250. The first end 250 can comprise a first opening 246, which can be positioned at the axial center of the first end 250 or off-center. The first opening 246 can be of any shape or size. For example, in FIG. 2 the first opening 246 can be substantially circular and can be positioned at the axial center of the first end 250. The diameter of the first opening 246 can be preferably smaller than the diameter of the first end 250. Additionally, the first opening 246 can be notched in order to receive and secure a sensor, such as an occupancy sensor 268. The first opening 246 can also have a raised rim 254 substantially surrounding its circumferential edge. The first end 250 can also have a second opening 248, which can be located towards a periphery of the first end 250. The second opening 248 can be of any shape or size. In one aspect, the second opening 248 can be substantially circular and located towards the periphery of the first end 250. Additionally, the second opening 248 can be notched in order to receive and secure a sensor, such as an ambient light sensor 266. A diameter of the second opening 248 can be smaller than the diameter of the first opening 246.

Second end 252 can be closed or open to an interior of main body 240. In one aspect, the main body 240 can comprise a third opening 256. Third opening 256 can be located proximate to the second end 252 on an outside surface of the main body 240. The third opening 256 can be sized such that the cable 400 can pass through it.

Figure 2:
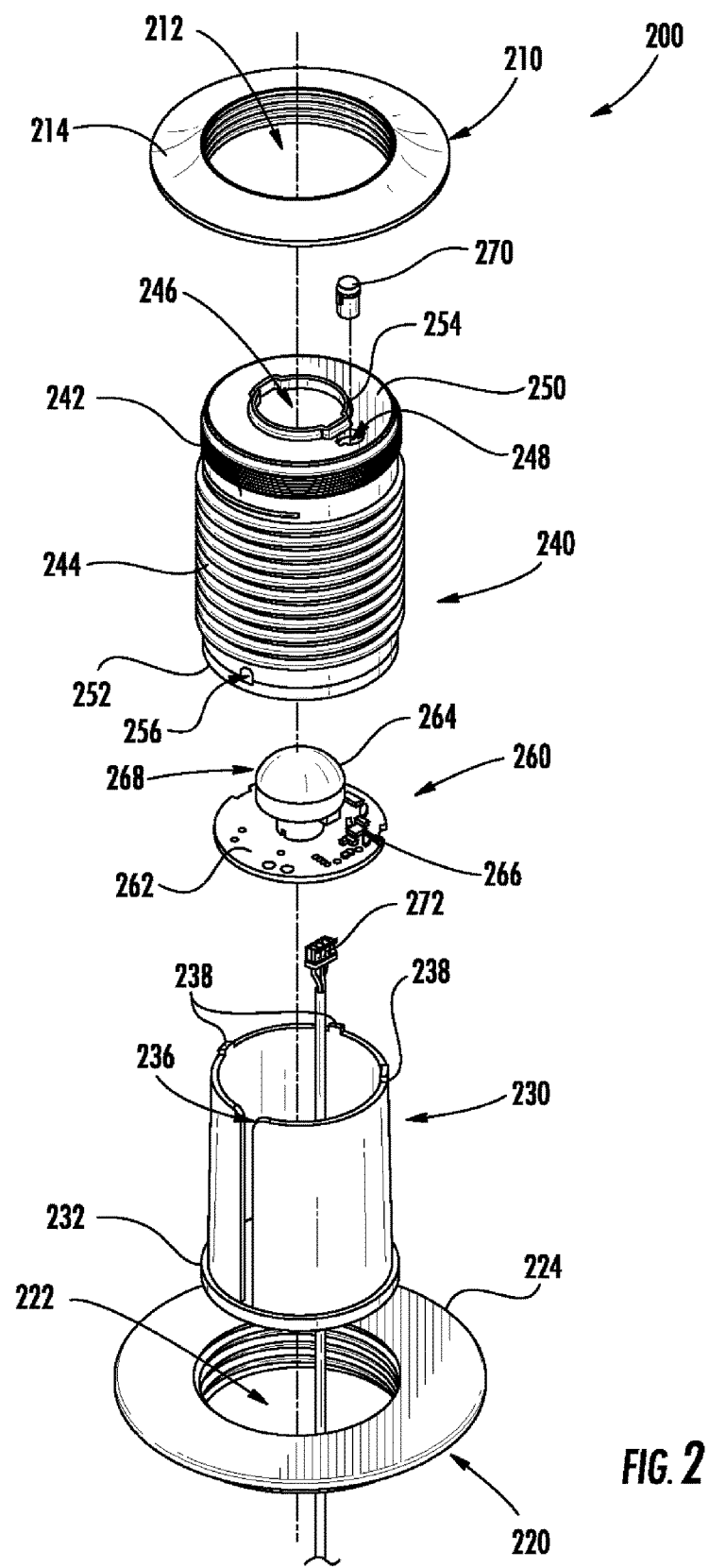
FIG. 2 is an exploded view showing a sensing device according to an embodiment of the subject matter described herein.
Figure 3A:
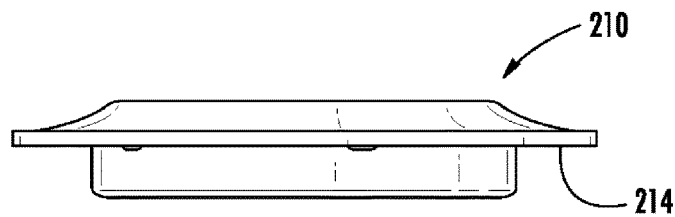
FIG. 3A is a side view showing a sensing device according to an embodiment of the subject matter described herein.
Figure 3B:
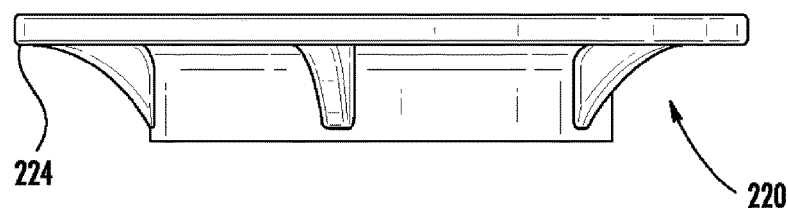
FIG. 3B is a side view showing a main screw according to an embodiment of the subject matter described herein.
Figure 4A:
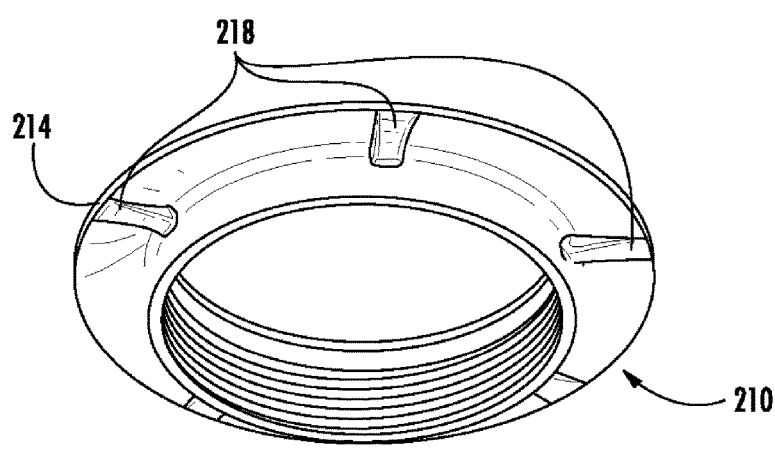
FIG. 4A is a bottom plan view showing a faceplate according to an embodiment of the subject matter described herein.
Figure 4B:
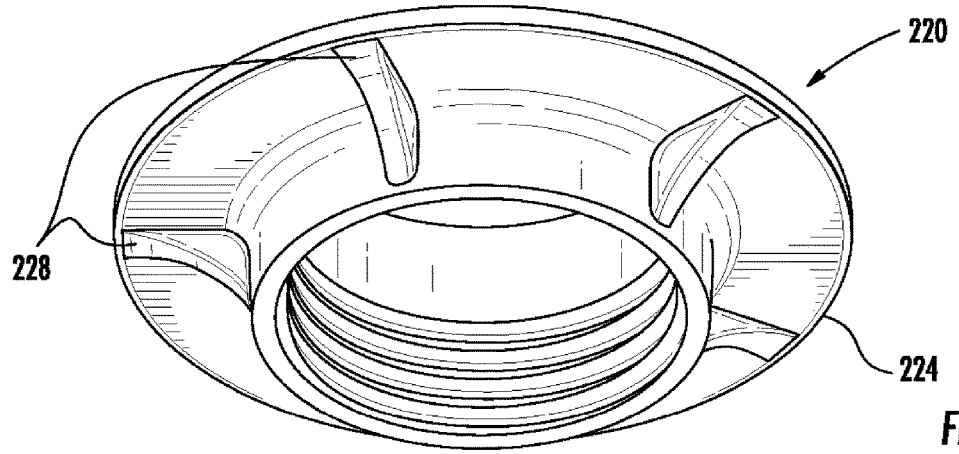
FIG. 4B is a bottom plan view showing a main screw according to an embodiment of the subject matter described herein.

The main body 240 can also comprise at least one threaded portion. In one aspect, the main body 240 can comprise threaded portions 242 and 244. The first threaded portion 242 and the second threaded portion 244 can be located on the outside surface of the main body 240 and can be the same or a different gauge of threading. First threaded portion 242 can be disposed towards the first end 250 of the main body 240, while the second threaded portion 244 can be disposed towards the second end 252 of the main body 250. The first threaded portion 242 and second threaded portion 244 can take up equal or unequal areas on main body 240. In FIG. 2, for example, the first threaded portion 242 takes up less surface area than the second threaded portion 244, and the first threaded portion 242 has a different gauge than the second threaded portion 244.

Sensing device 200 can also include a faceplate 210. Faceplate 210 can comprise a centrally located opening 212 and an annular protrusion 214. The opening 212 can be partially or fully threaded on its inner surface so that it can engage the first threaded portion 242 of the main body 240. Therefore, the threaded portion of opening 212 can have the same gauge as first threaded portion 242 and the diameter of opening 212 can be larger than the diameter of the first end 250. (See, for e.g., FIG. 2). The depth of threaded opening 212 can extend substantially above and/or below the annular protrusion 214 to accommodate first threaded portion 242. Each of a top and bottom rim of the threaded opening 212 can be flat, textured, or sloped. For example, the top rim of the threaded opening 212 can be sloped such that the annular protrusion 214 has a radially upward slope towards the top rim of the threaded opening 212. The bottom rim can be similarly shaped like the top rim. Further, annular protrusion 214 can have a disk-shaped surface that extends perpendicularly away from a longitudinal axis of retaining member 210. The annular protrusion 214 can also have a circumferential edge with any thickness. For example, the thickness of the circumferential edge of the annular protrusion 214 can be less than the depth from which the threaded opening 212 extends, so that faceplate 210 can look substantially T-shaped. (See, for e.g., FIG. 3A). Faceplate 210 can also comprise a plurality of curved struts 218, which can be disposed radially underneath the disk-shaped surface of the annular protrusion 214. (See, for e.g. FIG. 4A). The struts 218 can be shaped such that the top face of every strut 218 is on the same plane and at the same level as an outside edge of the first portion 214.

The remote sensing device 200 can also comprise a main screw 220. The main screw 220 can comprise a centrally located opening 222 and an annular protrusion 224. The opening 222 can be partially or fully threaded on its inner surface so that it can engage second threaded portion 244 of the main body 240. Therefore, the threaded portion of opening 222 can have the same gauge as second threaded portion 244 and the diameter of opening 222 can be larger than the diameter of the second end 252. (See, for e.g., FIG. 2). The depth of threaded opening 222 can extend substantially below a surface of first portion 224 to accommodate the second threaded portion 244. Each of a top and bottom rim of the threaded opening 222 can be flat, textured, or sloped. Further, annular protrusion 224 can have a disk-shaped surface that extends perpendicularly away from the longitudinal axis of main screw 220. In one aspect, the annular protrusion 224 can have a circumference that can be larger than the circumference of the annular protrusion 214. Additionally, a circumferential edge of the annular protrusion 224 can have any thickness. For example, the thickness of the circumferential edge of the annular protrusion 224 can be less than the depth from which the threaded opening 222 extends, so that main screw 220 can be substantially T-shaped. (See, for e.g., FIG. 3B).

Main screw 220 can also comprise a plurality of curved struts 228, which can be disposed radially underneath the disk-shaped surface of annular protrusion 224. (See, for e.g. FIG. 4B). The struts 228 can be shaped such that the top face of every strut 228 is on the same plane and at the same level as an outside edge of the first portion 224. In one aspect, the struts 228 can be substantially triangular.

The sensing device 200 can also comprise an inner body 230. For example, in FIG. 2 the inner body 230 can be substantially cylindrical and can be sized such that it can have an external diameter smaller than an internal diameter of the main body 240. This can allow the main body 240 to wholly receive the inner body 230 within its inner hollow cavity. The inner body 230 can also comprise a slit 236 oriented parallel to the longitudinal axis of the main body 230 and running lengthwise along an outer surface of the inner body 230. The slit 236 can run from one end of the inner body 230 to any distance less than a length of the inner body, and can be wide enough to fit a diameter of cable 400. The inner body 230 can also comprise a substantially planar bottom surface 232 with a diameter that can be larger than the external diameter of the inner body 230, and can be substantially the same diameter as the external diameter of the main body 240. An electrical connector such as for example electrical connector 272 can be disposed through the opening through inner body 230 and can be used for providing electrical contact to any components on substrate 262.

The sensing device 200 can comprise a sensor feature 260. For example, in FIG. 2 sensor feature 260 can comprise a substrate 262 and at least an ambient light sensor 266. Additionally, sensor feature 260 can include an occupancy sensor 268. The substrate 262 can be substantially circular, while outer edges of substrate 262 can include notches, which coincide with alignment features 238 disposed on a top edge of the inner body 230. The diameter of substrate 262 can be substantially the same as the diameter of the inner body 230. In one aspect, when substrate 262 is axially aligned with inner body 230, outer circumferences of substrate 262 and inner body 230 can be in substantial alignment and the notches can receive alignment features 238 in order to create an integral fit between the two components.

Ambient light sensor 266 can be configured to detect a broad band of visible light or be configured to receive and/or filter out select bands of the visible and invisible light spectrum. For example, if the total amount of ambient light to be detected includes sunlight, an ambient light sensor capable of detecting a broad range of light can be used. If the sensing device 200 is positioned so that the total amount of light to be detected does not include sunlight and/or infrared light, an ambient light sensor can be provided with a special coating that filters out red light in the visible and infrared spectrum. Ambient light sensor 266 can be mounted on and electrically connected to substrate 262, centrally or peripherally. In one aspect, ambient light sensor 266 can be mounted proximal to the edge of substrate 262. A light pipe 270 can be disposed over ambient light sensor 266 and can be configured to be secured to the main body 240. Light pipe 270 can be secured to the main body 240 by alignment tabs deliberately disposed on an edge of ambient light sensor 266, positioned such that alignment tabs and notches at second opening 248 are in substantial alignment. When the inner body 230, coupled to the substrate 262 and/or ambient light sensor 266, is received within the main body 240, the notches at second opening 248 receive and retain the alignment tabs, thus securing ambient light sensor 266 within the main body 240. Moreover, sensing device 200 can include the occupancy sensor 268. Occupancy sensor 268 can be centrally mounted on the substrate 262, directly or on a spacer. Occupancy sensor 268 can be electrically connected to the substrate 262. Sensor feature 260 can also comprise a lens 264 disposed over occupancy sensor 268. Occupancy sensor 268 and/or lens 264 can be secured to the main body 240 by alignment tabs deliberately disposed on an edge of occupancy sensor 268, positioned such that alignment tabs and notches at first opening 246 are in substantial alignment. When the inner body 230, coupled to the substrate 262 and/or occupancy sensor 268, is received within the main body 240, the notches at first opening 246 receive and retain the alignment tabs, thus securing occupancy sensor 268 within the main body 240.

Figure 5:
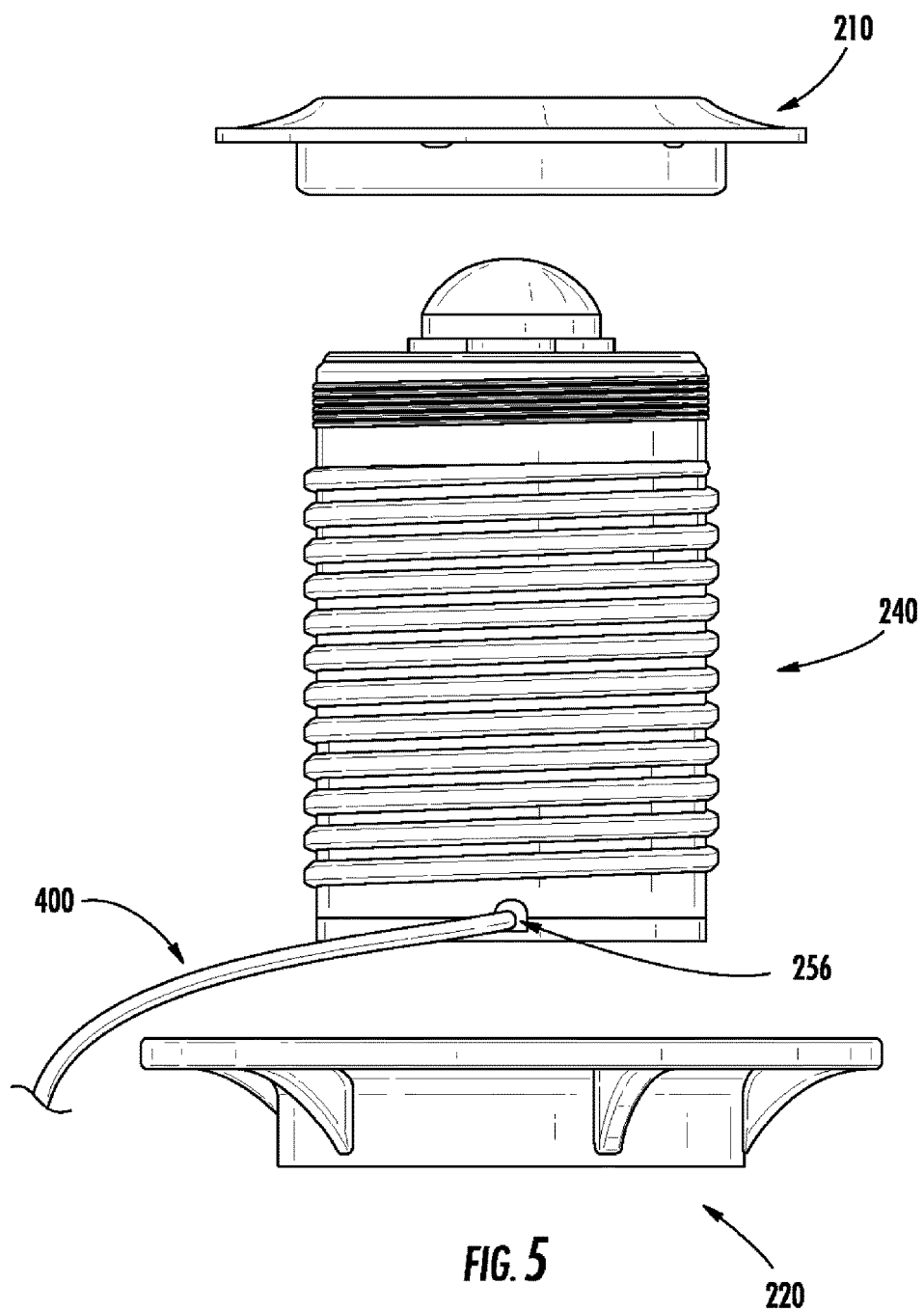
FIG. 5 is a partially exploded view showing a sensing device according to an embodiment of the subject matter described herein.
Figure 6:
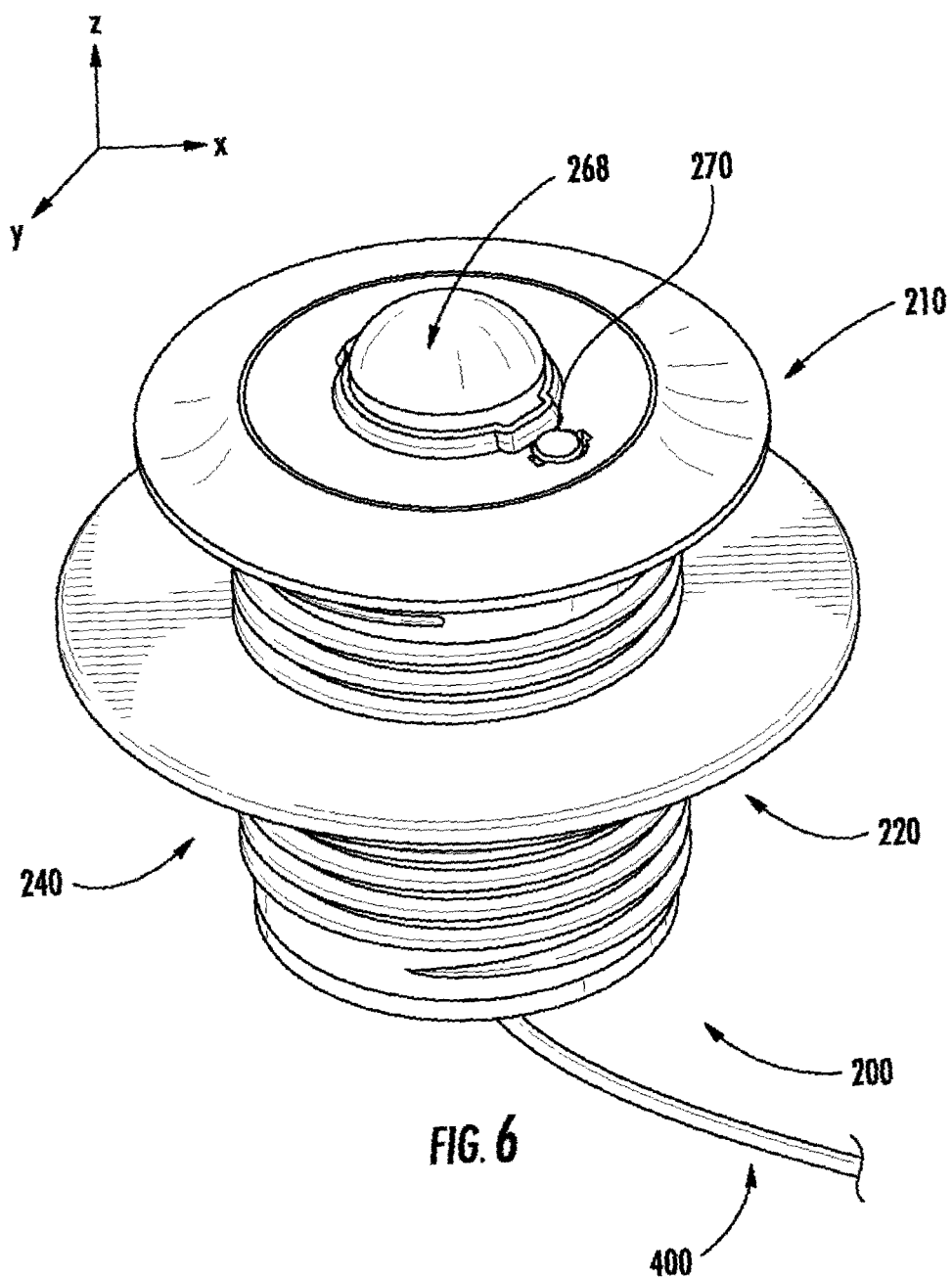
FIG. 6 is a perspective view showing a sensing device according to an embodiment of the subject matter described herein.
Figure 7:
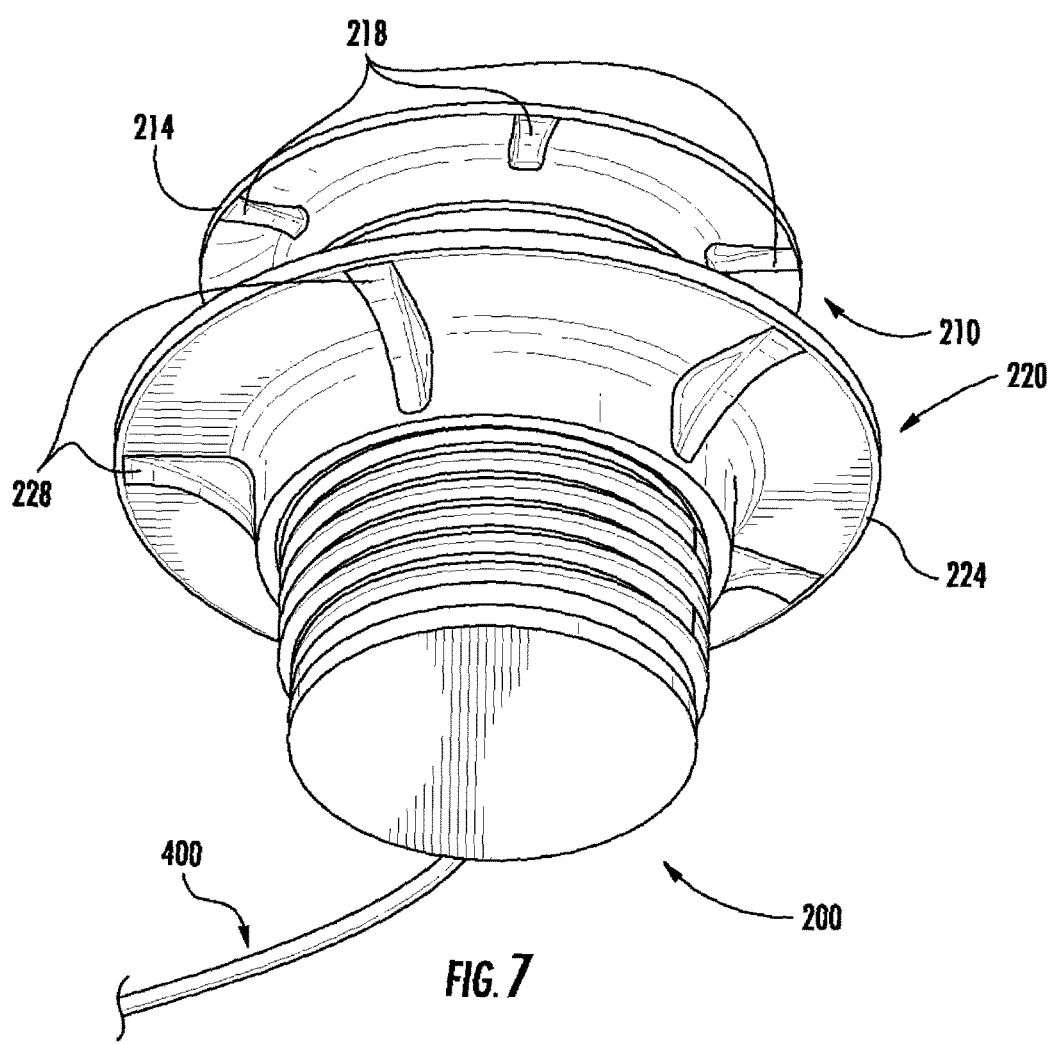
FIG. 7 is a perspective view showing a sensing device according to an embodiment of the subject matter described herein.
Figure 8:
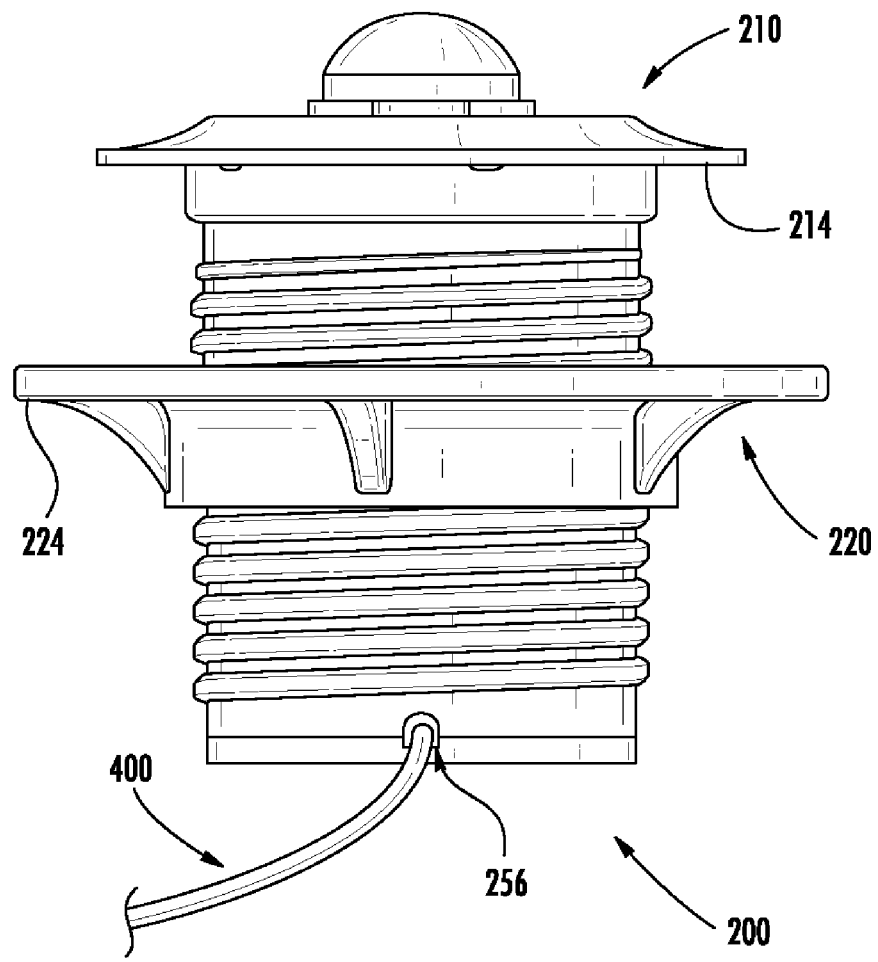
FIGS. 8 and 9 are side views showing a sensing device according to an embodiment of the subject matter described herein.
Figure 9:
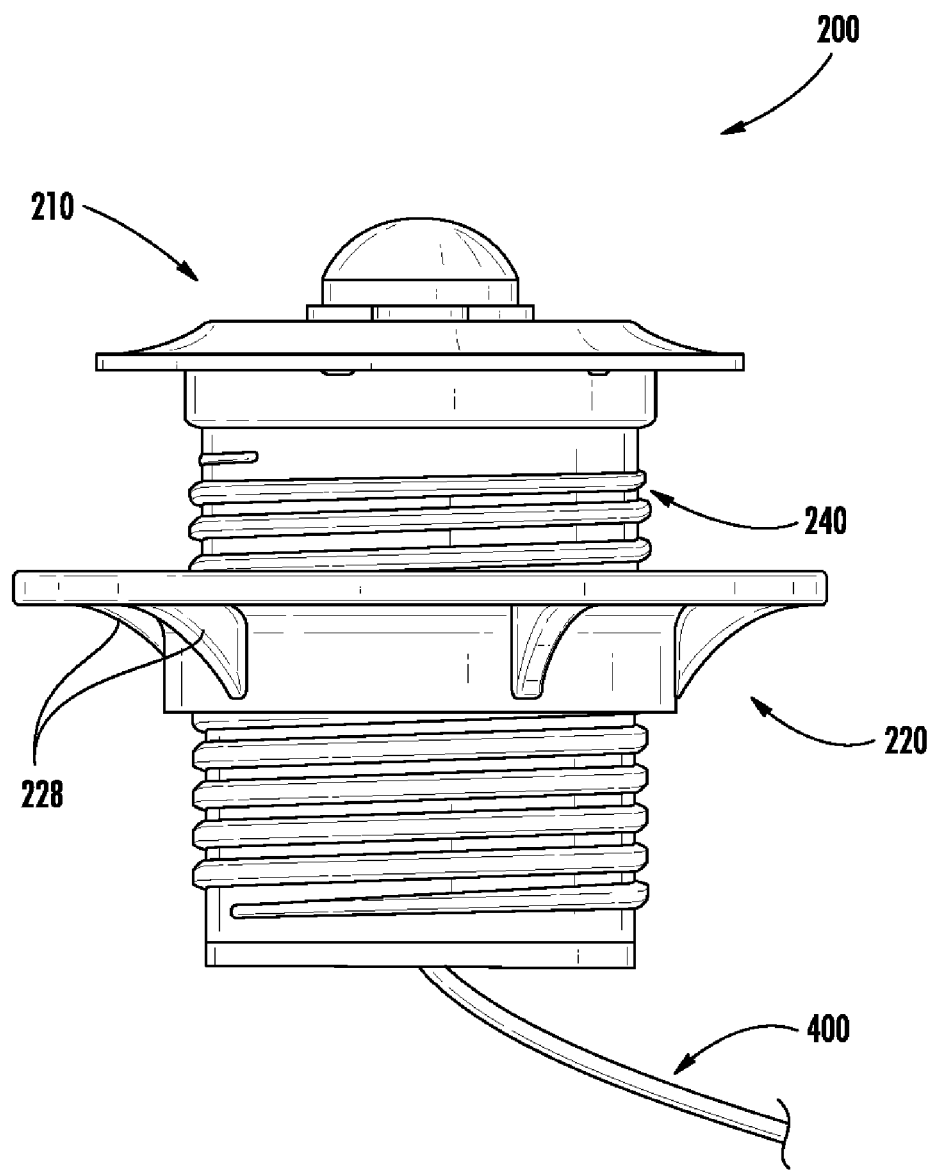
Figure 10:
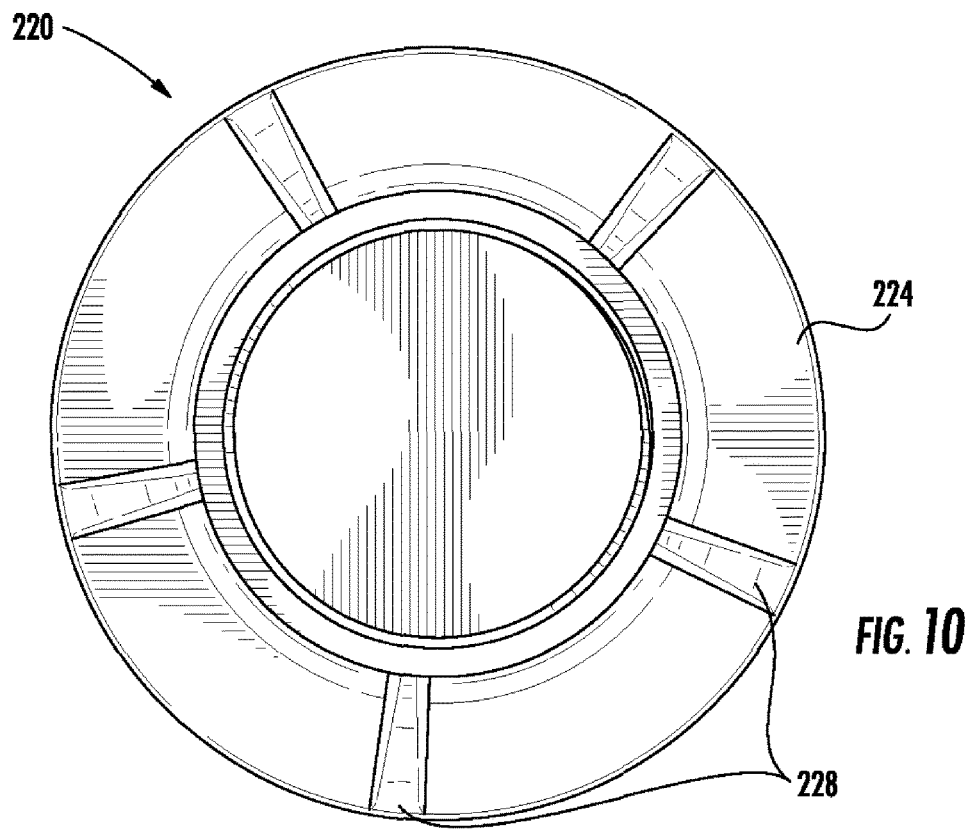
FIG. 10 is a top plan view showing a sensing device according to an embodiment of the subject matter described herein.
Figure 11:
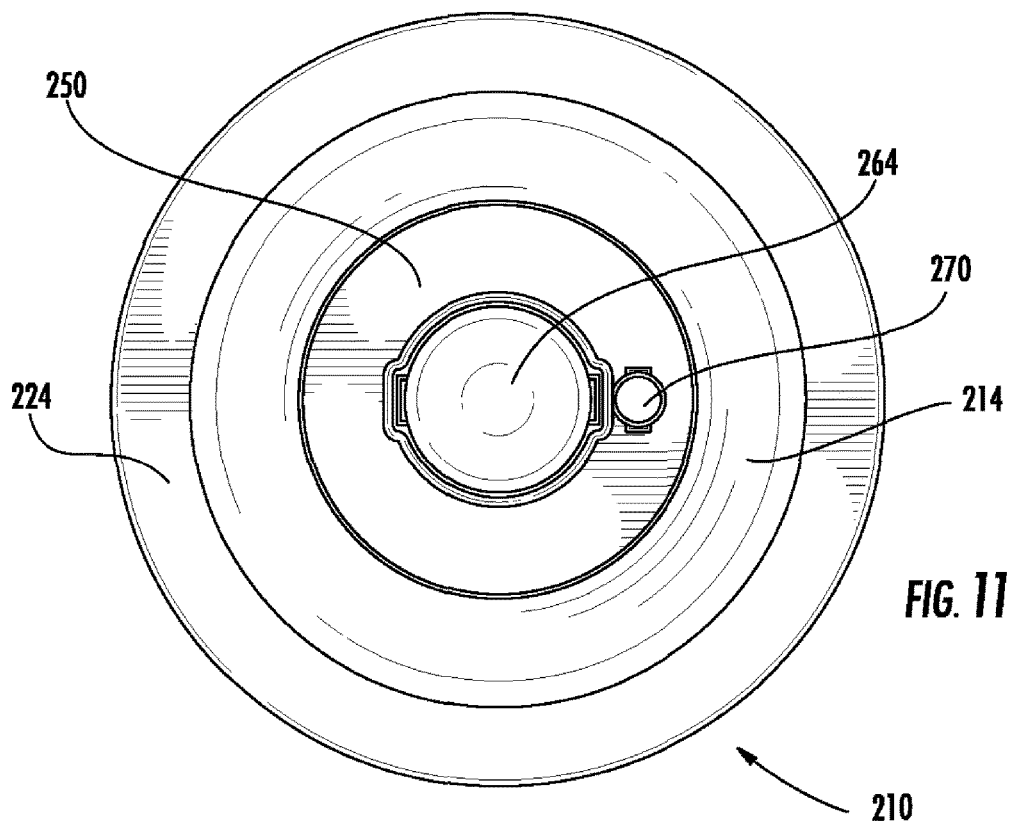
FIG. 11 is a bottom plan view of the sensing device according to an embodiment of the subject matter described herein.
Figure 12:
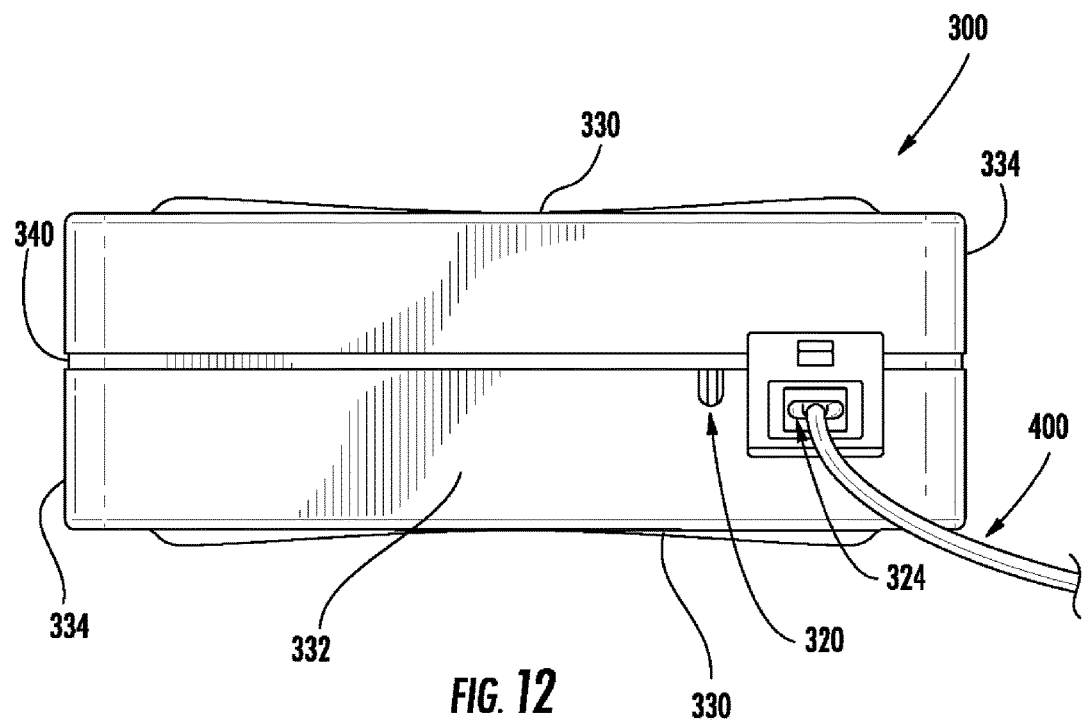
FIG. 12 is a rear view showing an interface according to an embodiment of the subject matter described herein.
Figure 14:
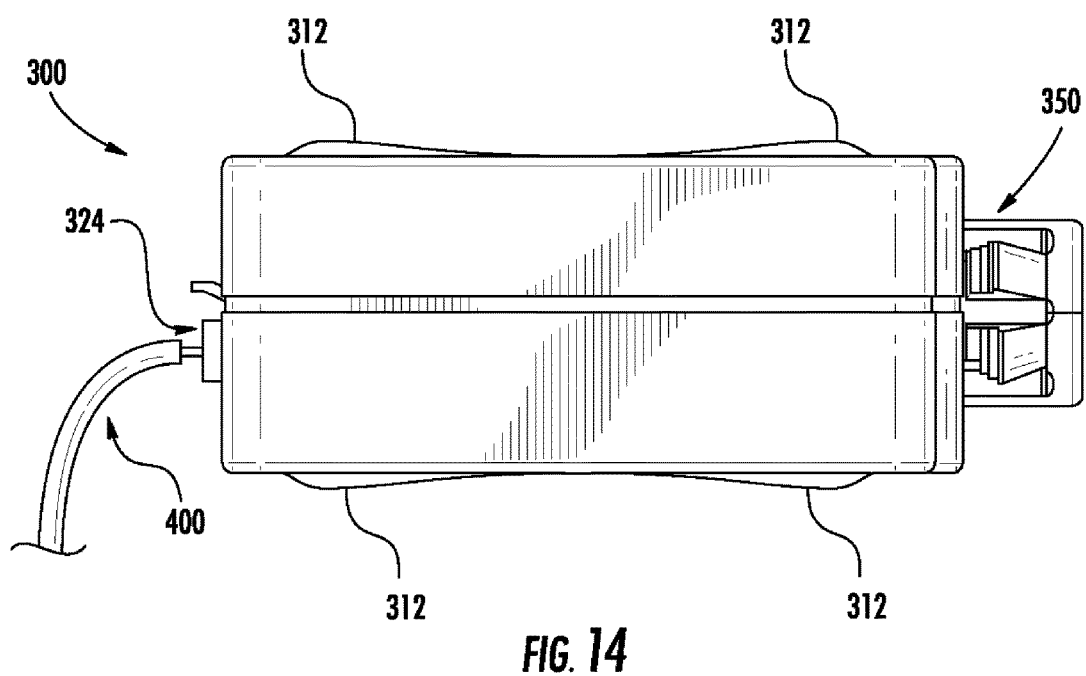
FIG. 14 is a side view showing an interface according to an embodiment of the subject matter described herein.
Figure 13A:
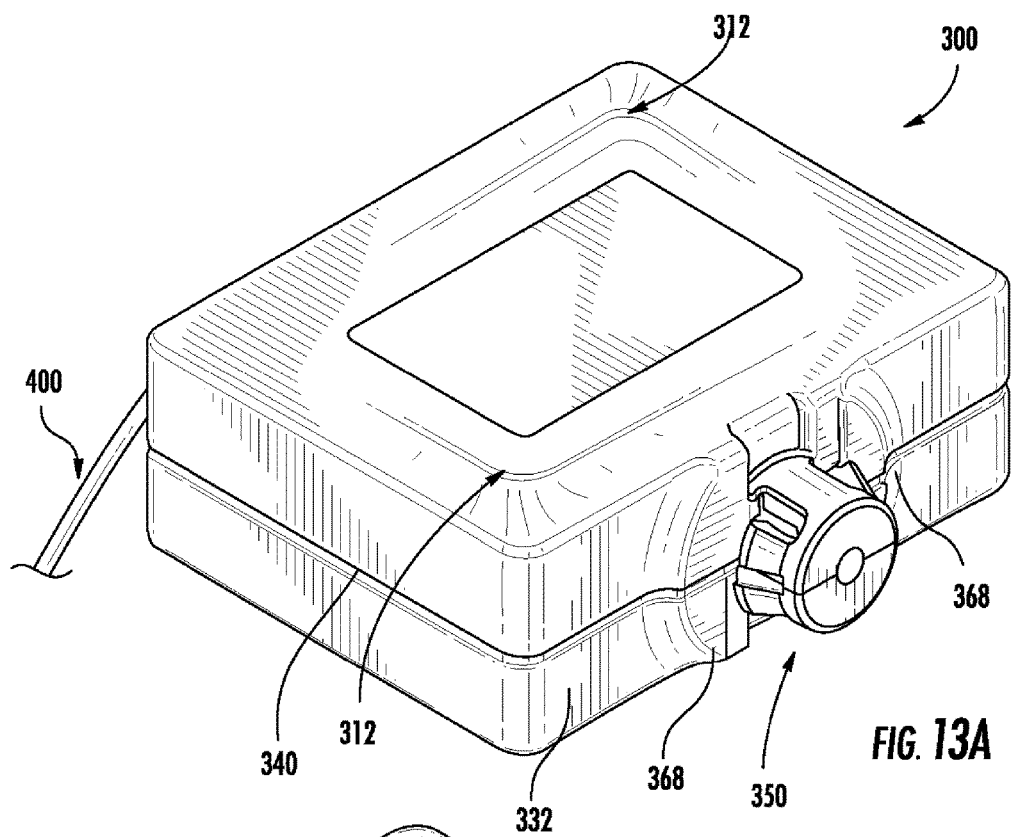
FIG. 13A is a perspective view showing an interface according to an embodiment of the subject matter described herein.
Figure 13B:
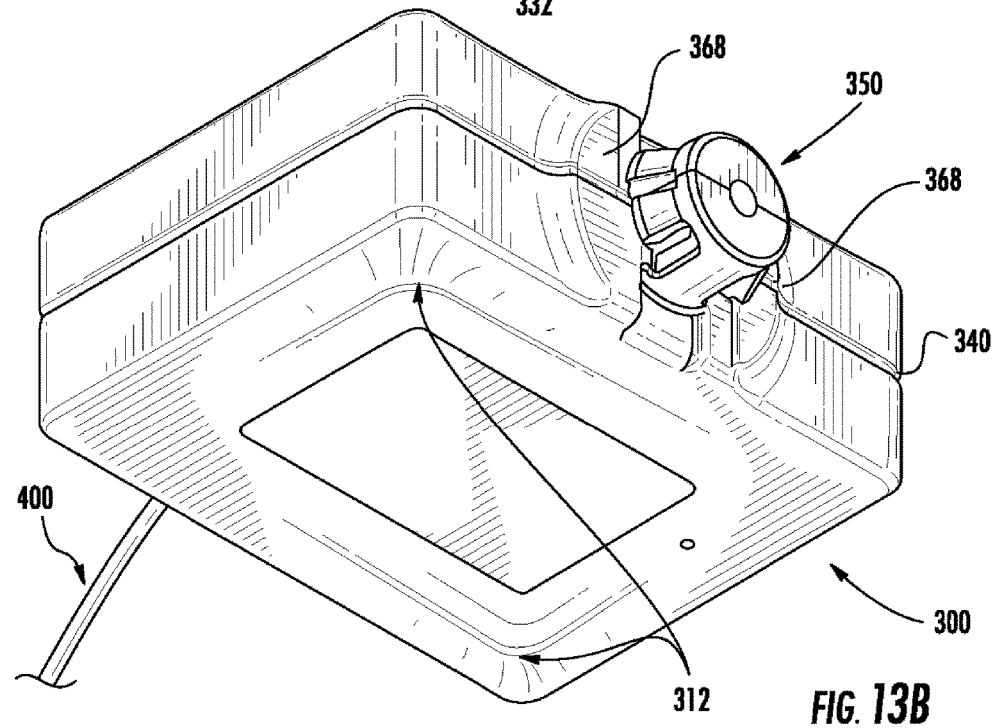
FIG. 13B is a perspective view showing an interface according to an embodiment of the subject matter described herein.
Figure 15:
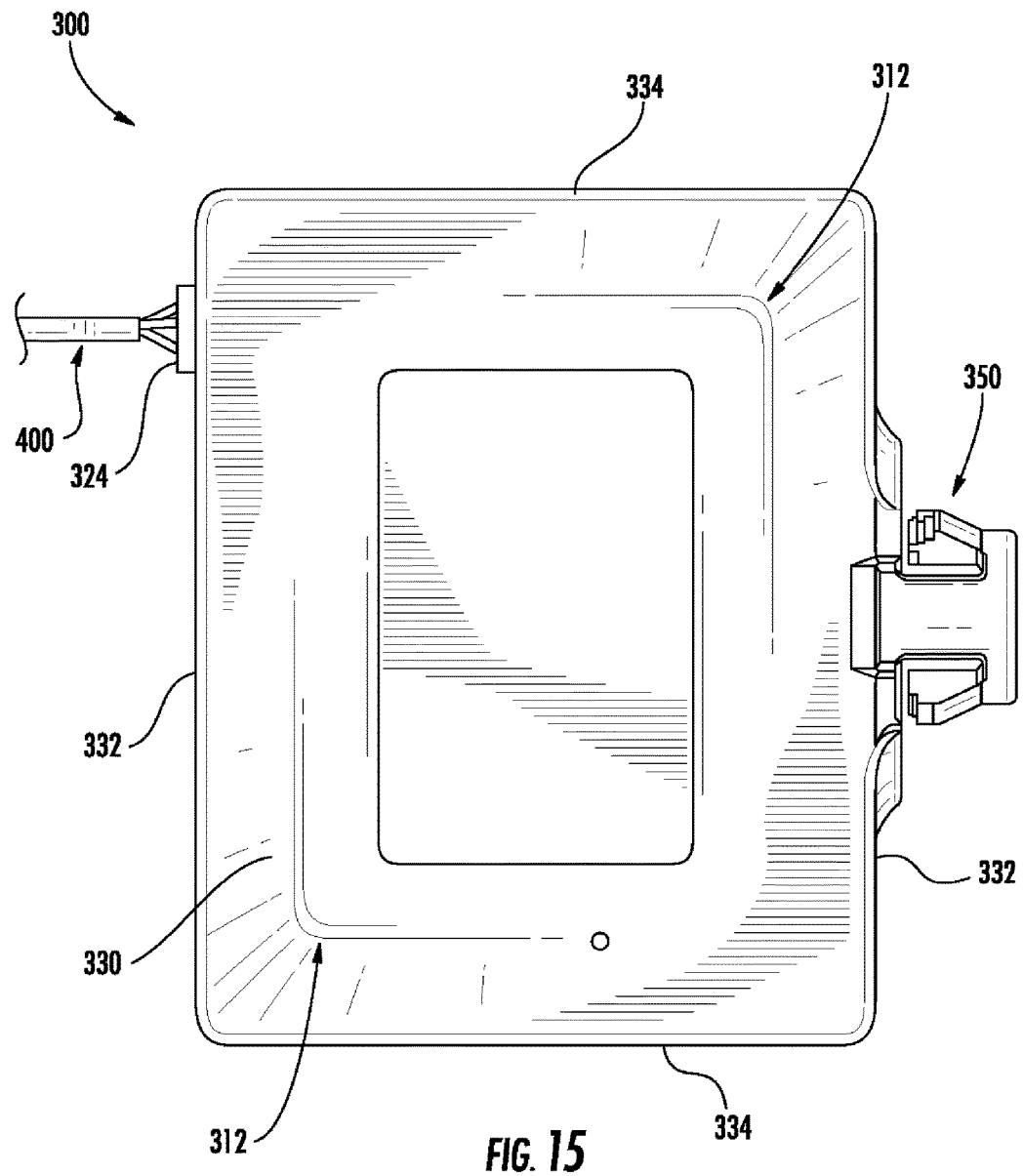
FIG. 15 is a bottom plan view showing an interface according to an embodiment of the subject matter described herein.
Figure 16:
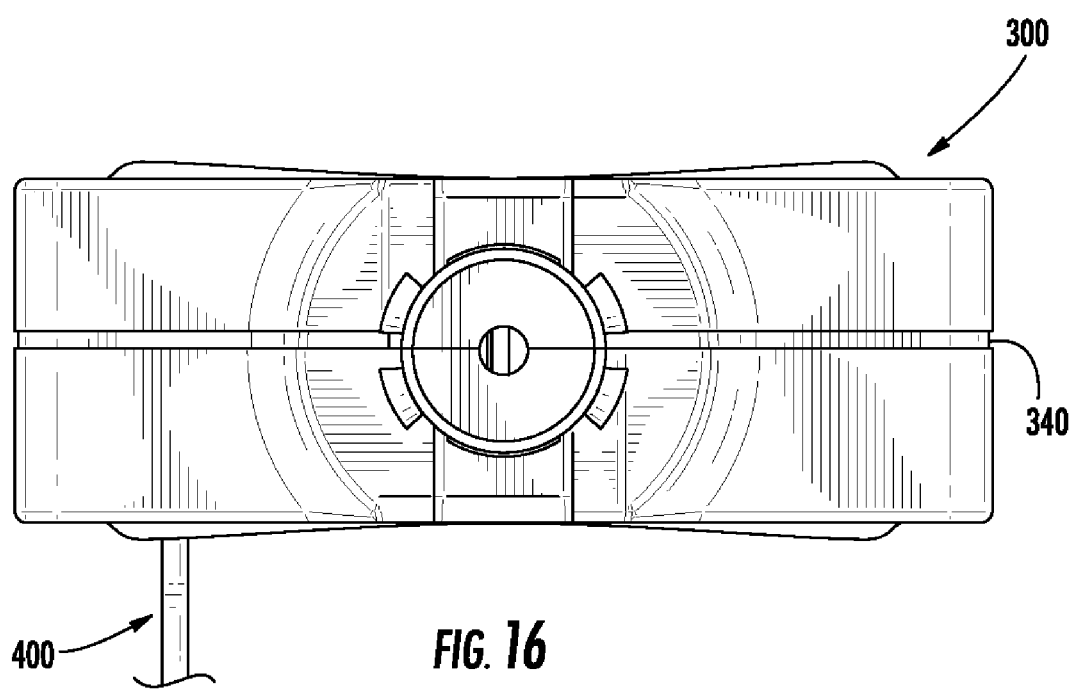
FIG. 16 is a front view of an interface according to an embodiment of the subject matter described herein.
Figure 17A:
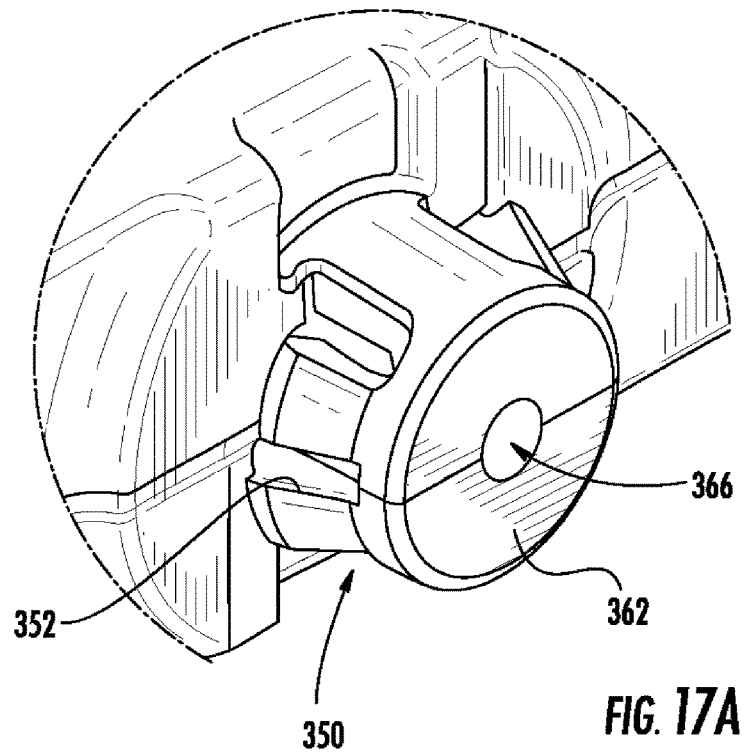
FIG. 17A is a front view showing a retention feature according to an embodiment of the subject matter described herein.
Figure 17B:
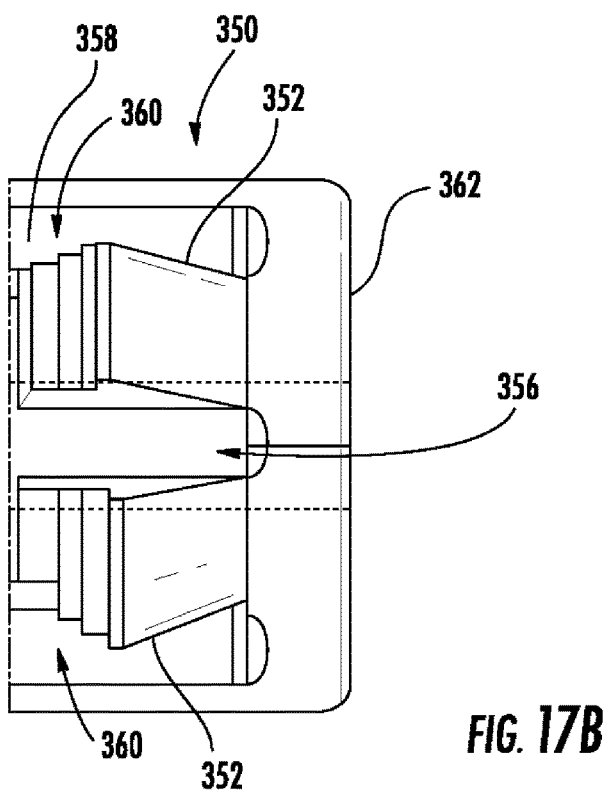
FIG. 17B is a side view showing a retention feature according to an embodiment of the subject matter described herein.

In FIG. 5, the main body 240, the inner body 230 and the sensor feature 260 have been coupled to one another in order to form an integral cylindrical unit. Slit 236 and third opening 256 can be aligned such that cable 400 can exit from the interior of the inner body 230. Faceplate 210 and main screw 220 are threadable onto main body 240. FIGS. 6-11 illustrate various views of sensing device 200 with both the faceplate 210 and main screw 220 threaded onto the main body 240. Faceplate 210 can be threaded either partially or totally onto first threaded surface 242 located at the first end 250. Main screw 220 can be partially or totally threaded onto second threaded portion 244 located at the second end 252. By rotating main screw 220 counterclockwise about the positive z-axis of the main body 240 the main screw 220 will be threaded further onto the main body 240, towards the first end 250. Conversely, by rotating the main screw 220 clockwise about the positive z-axis of the main body 240, the main screw 220 can be removed from the main body 240.

The interface 300 can comprise an enclosure 310 and a retention feature 350. The interface 300 and any component pieces can be molded, machined or assembled. The interface 300 can be made entirely out of any suitable material, such as, but not limited to, plastic, metal, or organic material or interface 300 can be made with some combination of materials. The enclosure 310 can be any shape or size and can be configured to contain electronics, such as, but not limited to, a driver module and/or a communications module. FIGS. 12-16 illustrate various views of the interface 300. The enclosure 310 can comprise a first pair of faces 330, a second pair or faces 332, and a third pair of faces 334. The first pair of faces 330 can have a larger surface area than the second pair of faces 332 and/or the third pair of faces 334. The first pair of faces 330, the second pair of faces 332, and the third pair of faces 334 can all be opposing pairs. In one aspect, the first pair of faces 330, the second pair of faces 332 and the third pair of faces 334 can form a rectangular prism, where the pairs of faces have varying dimensions. (See, for e.g., FIG. 12).

The enclosure 310 can comprise one or more openings. A first opening 320 can be disposed on one of the second pair of faces 332. In one aspect, the first opening 320 can be located centrally between the first pair of faces 330. (See, for e.g., FIG. 12). The first opening 320 can also be located substantially off the center between the third pair of faces 334. The first opening 320 can be any shape and can be sized such that a cable, cord, or wire can pass through. For example, first opening 320 can be an internal via provided on one of the second pair of faces 332 that is distal to the retention feature 350, such that a power cable (i.e. an AC cable) connectable to external devices is passed through first opening 320. Enclosure 310 can also comprise a second opening 322. Second opening 322 can be disposed on one of the second pair of faces 332. More specifically, the second opening 322 can be disposed in the face distal to the face with the first opening. The second opening 322 can be centrally located on this face and/or can be substantially circular. (See, for e.g. FIG. 19B).

The enclosure 310 can also comprise a port 324. Port 324 can be any port configured for an electrical connection, such as cable 400. Port 324 can be configured to receive any standard cable connector, such as, but not limited to, an RJ45, RJ25, or RJ14 cable for interfacing with a dimming control system In one aspect, port 324 is an eight position eight contact jack (8P8C). (See, for e.g., FIGS. 12 and 15).

Enclosure 310 can also comprise a trough 340. Trough 340 can run medially around an exterior of the enclosure 310, such that the trough 340 runs substantially parallel to first pair of faces 330. Trough 340 can be disposed solely on the second pair of faces 332 and/or the third pair of faces 334. (See, for e.g., FIG. 12). Further, the enclosure 310 can also comprise one or more rib features 312. Rib features 312 can be placed on each of the first pair of faces 330. Rib features 312 can comprise a raised ridgeline, with a downward slope on both sides off the ridge. Rib feature 312 can have a substantially L-shaped ridgeline that can be positioned proximate to edges and/or corners of each of the first pair of faces 330. Each side of the first pair of faces 330 can have a plurality of rib features 312. (See, for e.g., FIGS. 13A and 13B). The enclosure 310 can additionally include a plurality of protrusions 368. As in FIGS. 13A and 13B, the protrusions 368 can be located on one of the second pair of faces 332 (e.g on the second face that contains the retention feature 350), and can extend between the first pair of faces 330. The protrusions 368 can be of any shape and/or size. In one aspect, the protrusions 368 can have a profile that is semi-circular and can protrude from the enclosure 310 less than the retention feature 350 does.

Retention feature 350 can be provided on one of the second pairs of faces 332 and can comprise a body 358 and at least one tab 352. (See, for e.g., FIGS. 17A and 17B). Body 358 can be of any shape and size. In one aspect, body 358 can be substantially cylindrical and can be smaller than the enclosure 310. One end of the body 358 can be integral with or attached separately to enclosure 310. The body 358 can have a passage 356, which runs through a length of the body 358. Passage 356 can have a width that remains constant through the length of the passage 356 or it can vary in width throughout the length of body 358. In one aspect, the passage 356 can be annular. For example, the body 358 can be positioned over the second opening 322 in enclosure 310, such that the passage 356 can be aligned with the second opening 322, thereby allowing cable(s) to exit the enclosure 310 through opening 322 and passage 356. The body 358 can also have a top portion 362. Top portion 362 can be substantially annular in shape. In one aspect, the top portion 362 can have a larger diameter than a diameter of the body 358. In addition, the top portion 362 can have an opening 366 that can align with passage 356. In one aspect, opening 366 can be circular and can have a smaller diameter than a diameter of the top portion 362.

Retention feature 350 can also include at least one tab 352 that can be attached onto or integral to top portion 362 and/or body 358. In one aspect, the at least one tab 352 can be angled off of the top portion 362, such that there can be open space between the body 358 and the tab 352. The tab 352 and top portion 362 can be constructed such that the tab 352 can be elastically displaced one direction; whereby, pressure applied to an outer surface of the tab 352 elastically displaces the tab 352 inward towards the body 358. The retention feature 350 can comprise a plurality of tabs 352. For example, there can be four or any other suitable number of tabs 352. The plurality of tabs 352 can comprise tabs of different lengths and sizes. In one aspect, the tabs 352 can be in opposing pairs. The pairs can be the same as or different from each other. In another aspect, there can be two opposing pairs of tabs 352, and one pair can be longer than the other.

Figure 20A:
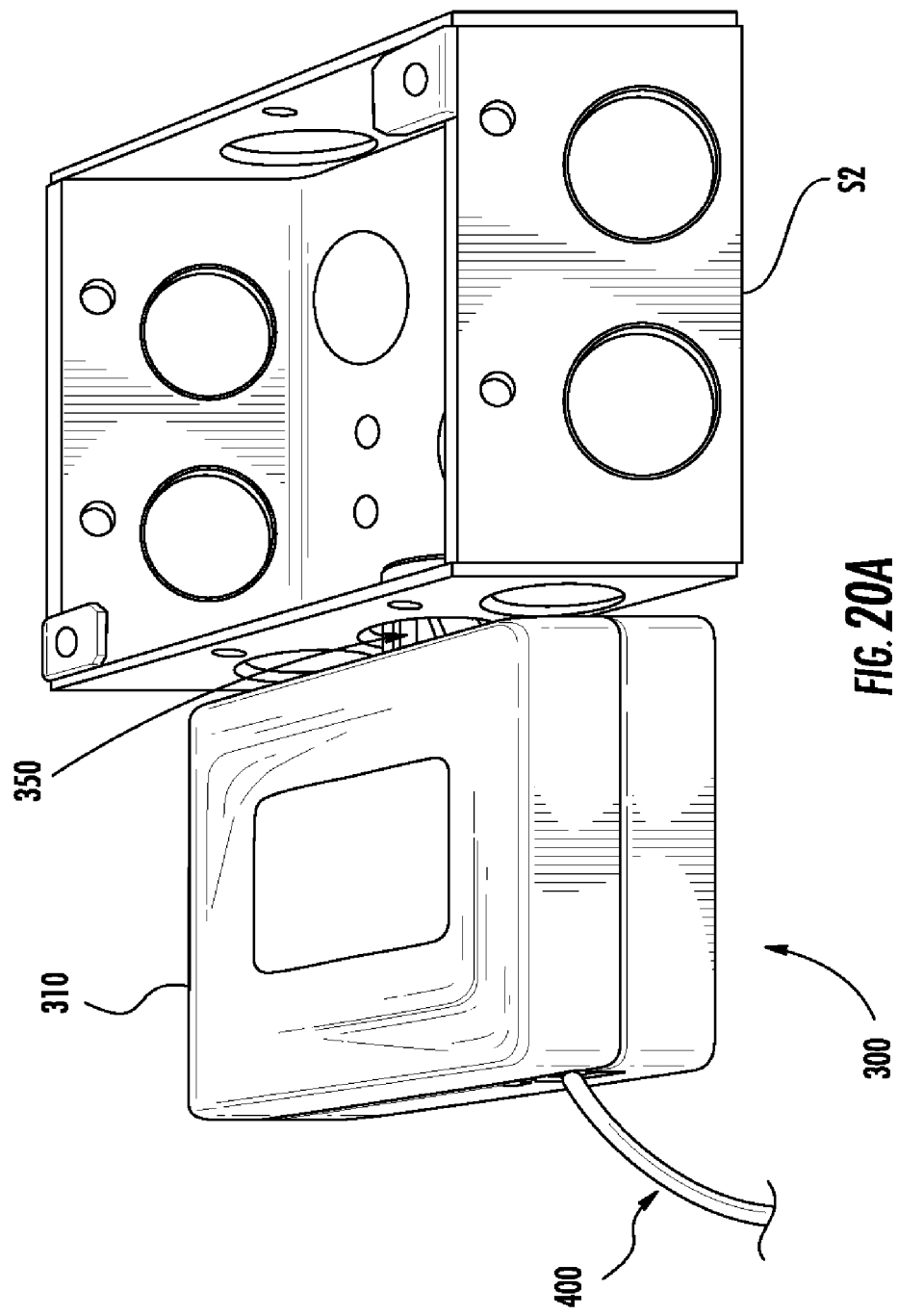
FIGS. 19A-21B are perspective and sectional views showing in detail a method of installing an interface to a support structure according to an embodiment of the subject matter described herein.
Figure 20B:
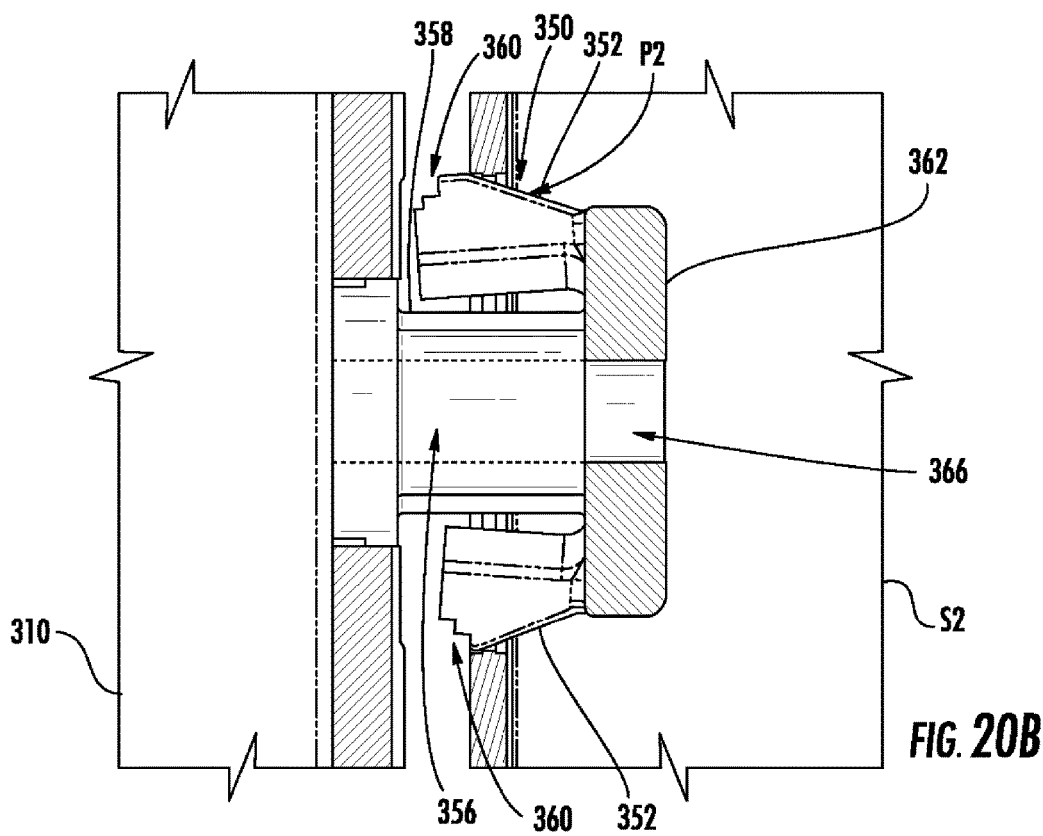
Figure 21A:
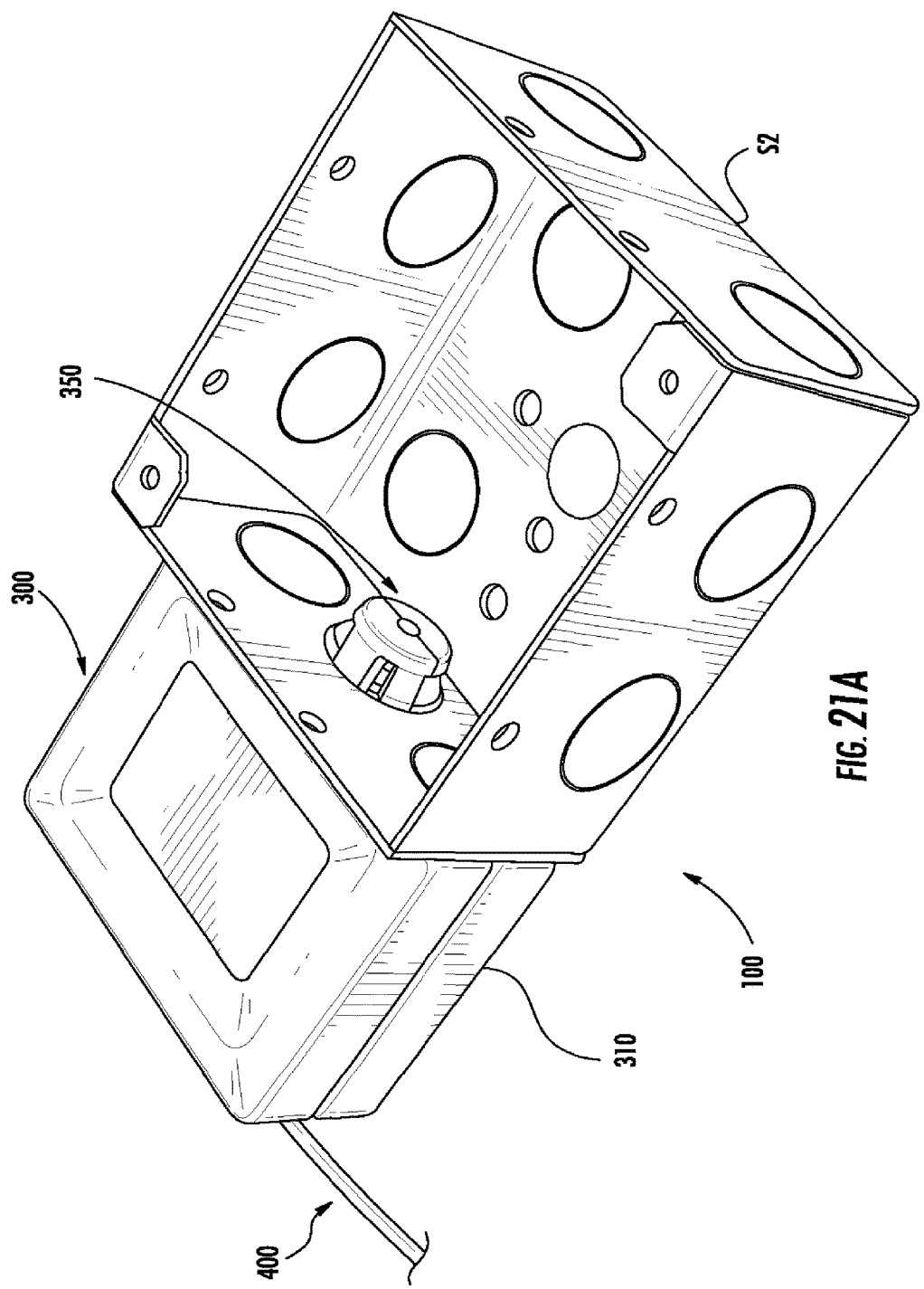
Figure 21B:
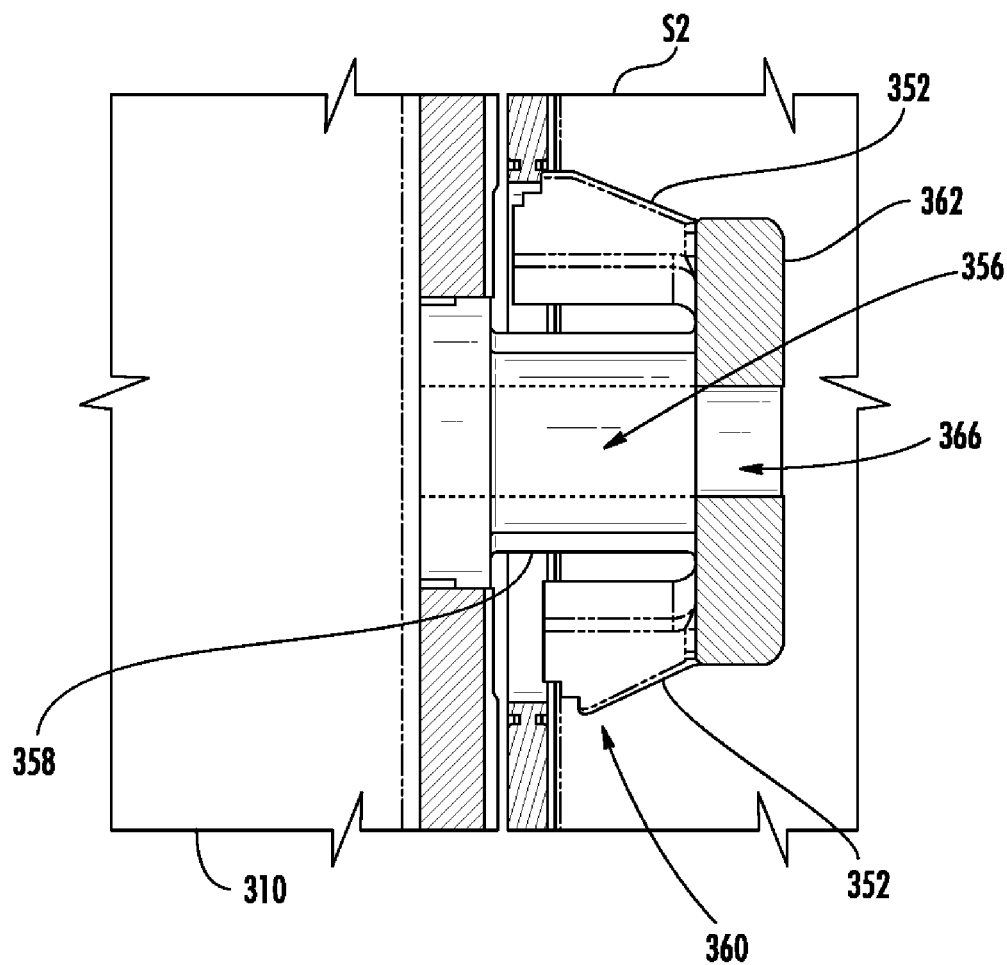
Figure 22:
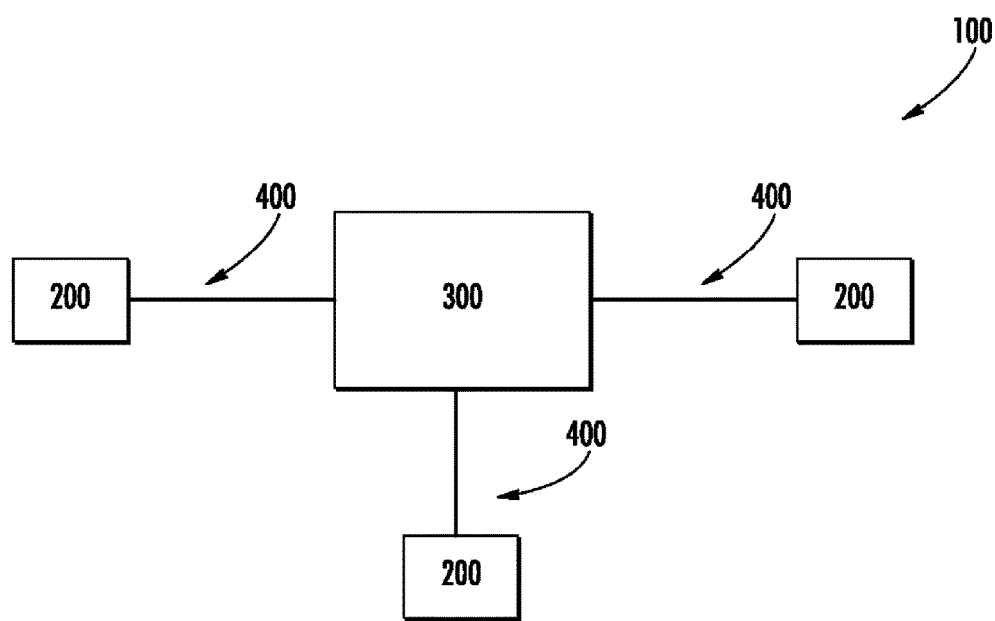
FIG. 22 is a schematic view showing multiple sensing devices connected to one interface according to an embodiment of the subject matter described herein.

Tabs 352 can be sized such that when pressure is applied to the tab 352, each of such tabs 352 can displace a specified amount with regard to an original resting position, as in FIG. 20B. The amount of displacement can be determined by the material that the tab 352 is manufactured out of, such as a polycarbonate (PC) resin. Each of tabs 352 can be of any length less than the distance from the top portion 362 to one of the second pairs of faces 332 that the retention feature 350 can be attached to, and can be of a short enough length that there can be a gap between the end of the tab 352 and the surface of the face 332. Each of tabs 352 can have any shape or form, such as, but not limited to, rectangular, L-shaped, or triangular. In one aspect, each of tabs 352 can have a substantially triangular form, where the narrowest part of the tab is attached to the top portion 362. Similarly, a surface of each of the tabs 352 can be angled such that the surface of each of the tabs 352 angles out from the top portion 362 at a specified angle.

Additionally, the end of tabs 352 distal to the top portion 362 can comprise one or more detents 360 integrated into a surface of the tab 352, where such detents 360 can secure the retention feature 350 within a variety of differently sized openings in a support structure. Detents 360 can take the form of a step feature, a ridge, or a notch. In one aspect, there can be at least two detents 360 of differing sizes on each of the tabs 352. Where there is at least one detent 360 integrated into the surface of each of tabs 352, the at least one detent 360 can catch onto an edge of the opening and secure the retention feature 350 securely within the opening. It is contemplated that the more detents 360 on a tab such as tabs 352, the greater the versatility the retention feature can have, as more detents 360 can enable the retention feature 350 to fit within a larger variety of different sized openings. In one aspect, detents 360 in the form of a step feature can be integrated into the edge of tab 352 that is distal to the main body 358. Such detents 360 can be formed to catch onto an edge of an opening in a support structure, such as a junction box with a half-inch (½ in.) opening or knockout, to permit the interface 300 to removably attach or secure to an interior of the support structure.

Figure 18A:
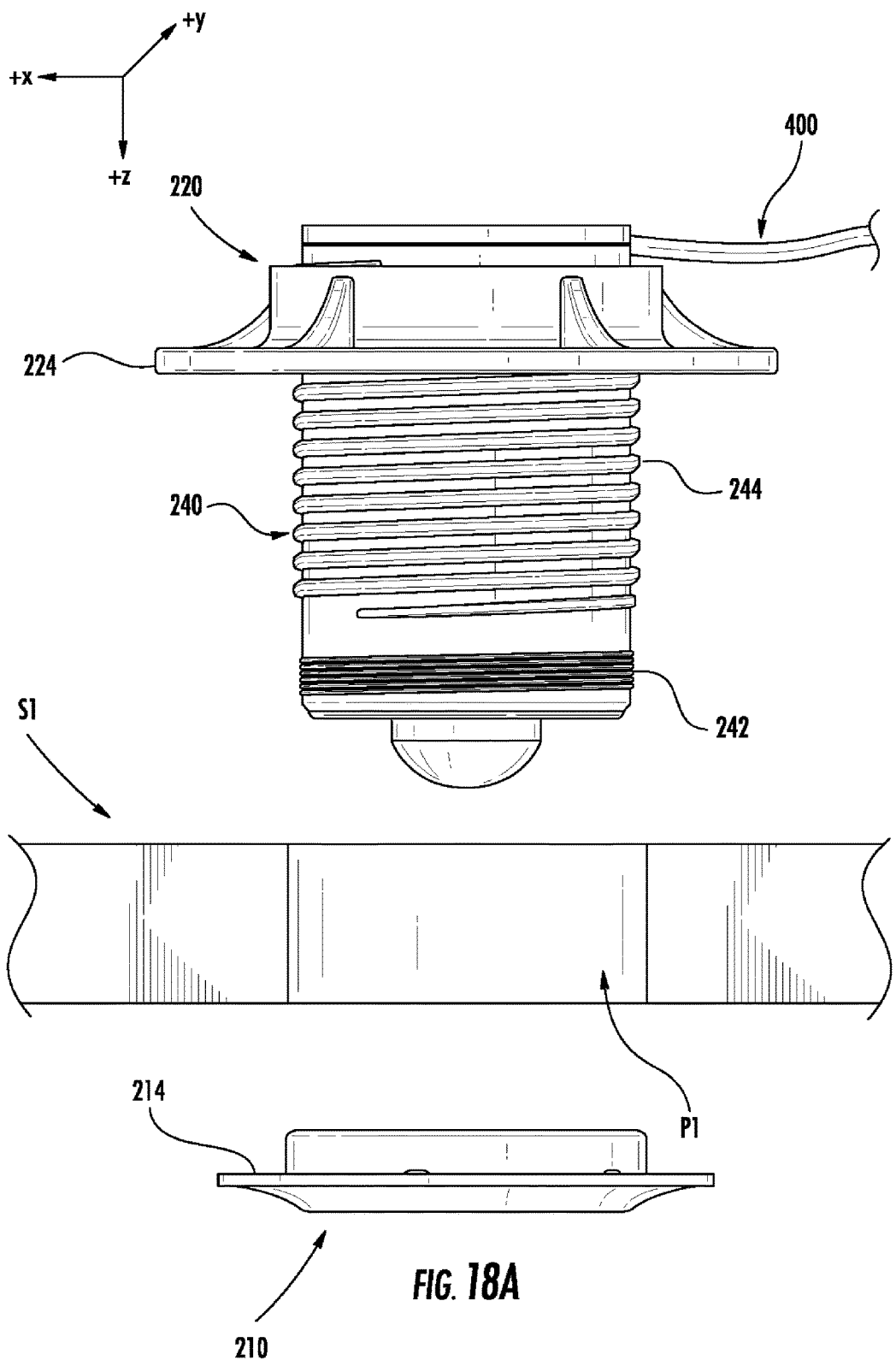
FIGS. 18A-18C are sectional views showing in detail a method of installing a remote sensing device to a support structure according to an embodiment of the subject matter described herein.
Figure 18B:
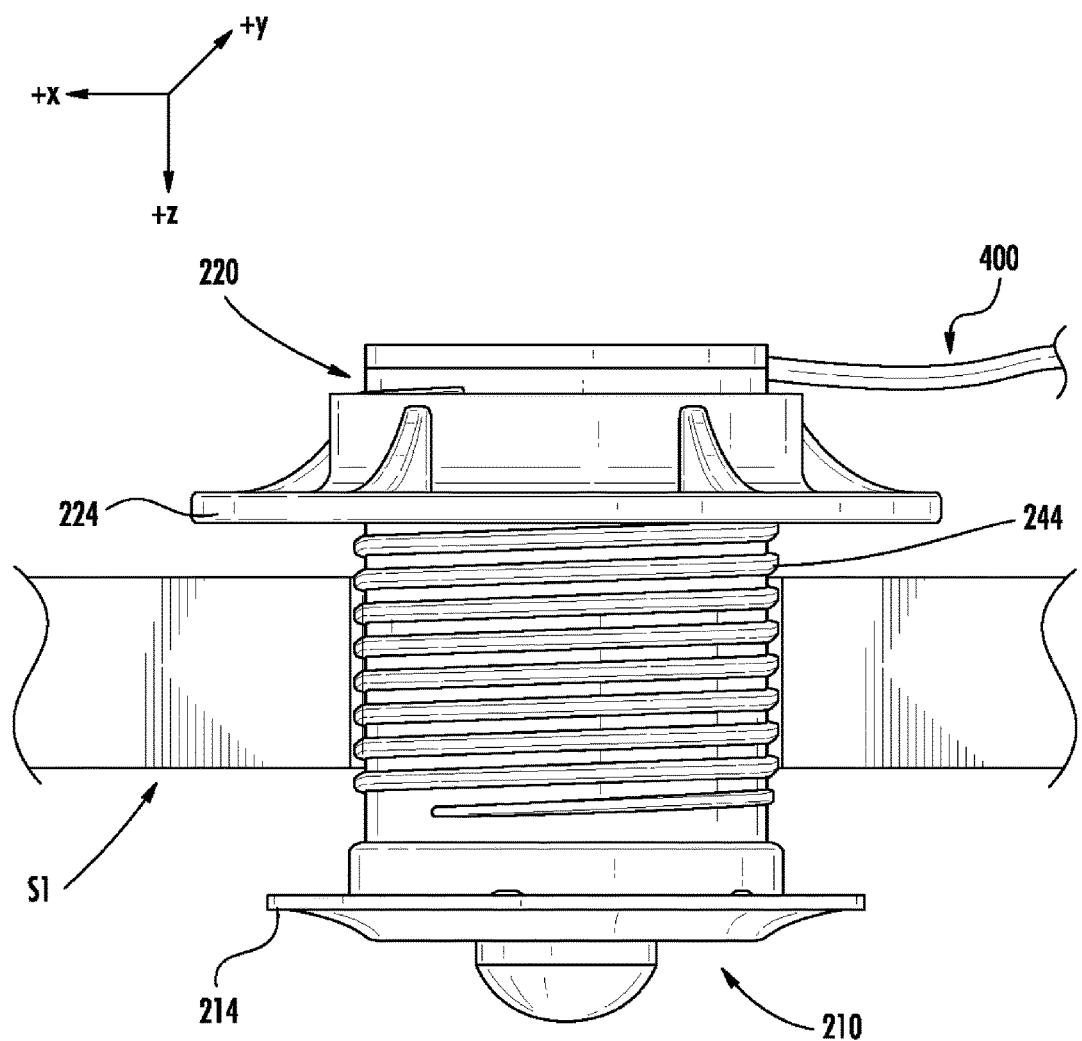
Figure 18C:
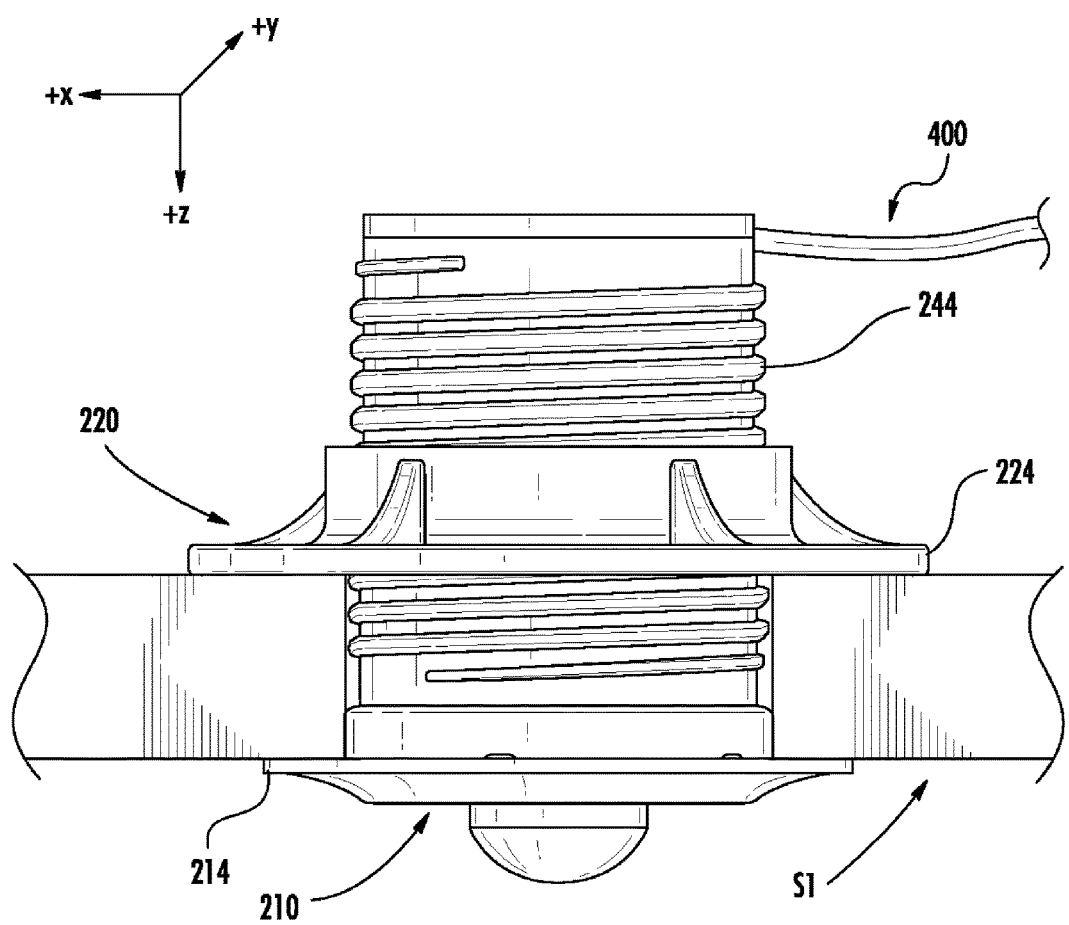
Figure 19B:
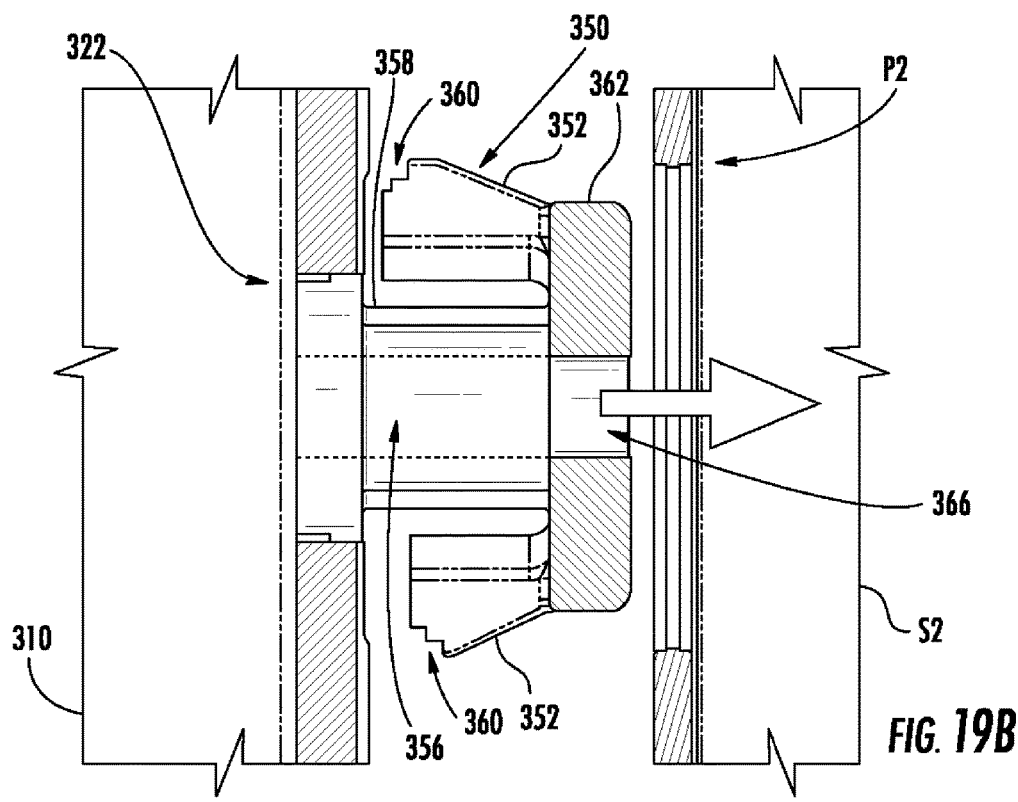

With regard to installation of the system 100, the sensing device 200 and the interface 300 can be attached and installed onto different retaining structures. The sensing device 200 can attach to a retaining structure S1 by faceplate 210 and main screw 220. FIGS. 18A-18C illustrate installation of the sensor assembly 200 into the retaining structure S1, for example a ceiling. The structure S1 can be of any shape or size, with at least one flat surface. The structure S1 can also have an opening P1, which can be formed or cut-out, through the flat surface. The opening P1 can be substantially circular and sized so that the main body 240 of the sensing device 200 can pass through it, but the faceplate 210 and the main screw 220 cannot. For example, the diameter of the opening P1 can be larger than the diameter of the main body 240, but smaller than the diameters of the annular protrusion 214 and annular protrusion 224. Structure S1 can have a wall thickness at or less than the length of the main body 240. For example the structure S1 can have a thickness between approximately 6 mm and 43 mm or any sub-range thereof.

In order to install sensing device 200 in structure S1, faceplate 210 and main screw 220 can be removed from the main body 240. The sensing device 200 can be inserted through the opening P1, such that the second end 252 of the main body 240 is positioned behind the structure S1. For example, in FIG. 18A, the first end 250 of the main body 240 can be introduced through opening P1, while the second end 252 can remain behind structure S1. As in FIG. 18B, once the main body 240 has been inserted, the faceplate 210 and the main screw 220 can then be threaded onto the first end 250 and the second end 252, respectively. The faceplate 210 and main screw 220 can be adjusted such that the bottom surface of the annular protrusion 214 and the top surface of the annular protrusion 224 abut opposing surfaces of structure S1. (See, for e.g., FIG. 18C). Depending on the thickness of structure S1 the main screw 220 can be adjusted to accommodate different thicknesses. Main screw 220 can be threaded further up on the main body 240 by rotating the main screw 220 counterclockwise with respect to the positive z-axis, while the main screw 220 can be removed by rotating the second retaining member clockwise with respect to the positive z-axis.

FIGS. 19A-21B illustrate, without limitation, an example of installation of the interface 300 into retaining structure S2, such as a junction box. The interface 300 can be attached to a retaining structure S2 by retention feature 350. In one aspect, structure S2 can, for example, have a wall thickness approximately the distance between the enclosure 310 and the detents 360. The structure S2 can have an opening P2, which can be formed or cut-out, through a flat surface of S2. (See, for e.g., FIGS. 19A-B). The opening P2 can be sized such that the top portion 362 of the retention feature 350 can fit through opening P2, but the outermost portions of the tabs 352 can be too wide. For example, where the opening P2 is circular, the diameter of the opening P2 can be larger than the diameter of the top portion 362, except the total width of the tabs 352 in the original resting position is larger than the opening P2. When pressure is applied to the tabs 352, the tabs 352 can elastically flex towards the body 358 to allow the retention feature 350 to fully enter opening P2, as in FIGS. 20A-B. When the face 332 is substantially flush against the flat surface of structure S2, at least one detent 360 can catch onto the opposing surface of structure S2 to secure the retention feature 350 within an interior of support structure S2. Alternatively, the face 332 of the enclosure 310 does not have to be substantially flush against the flat surface of structure S2. (See, for e.g., FIGS. 21A-B). Once retention feature 350 is fully inserted within opening P2, the retention feature 350 can have all, some, or none of the tabs displaced from their resting position. The elastic disposition of the tabs allows a wider range of opening P2 sizes and structure S2 thicknesses. To remove the retention feature 350 from structure S2, and thus disconnect the interface 300 from the support structure S2 pressure need only be applied to the tabs 352. This can elastically flex the tabs towards the body 358 and allow the retention feature 350 to be withdrawn from within the opening P2.

The light fixtures described for example in U.S. patent applications Ser. Nos. 13/782,040 and 13/838,398 can comprise light fixtures as described, the system 100, and/or the system 100 plus one or more lights. Thus, the networks described in Ser. No. 13/782,040 can comprise the described light fixtures, the system 100, the system 100 plus one or more lights, or any combination of the former. For example, the system 100 can be grouped into a lighting zone with other systems 100 and/or lighting fixtures and can perform the same functions, such as entering lightcast mode and adjusting lighting levels based on sensor data. The system 100 can send and receive data to and from other light fixtures or systems. For the functions described in Ser. No. 13/838, 398, the ambient light sensor 266 can have a certain field of view, a task surface, and the system 100 can determine a set point for the one or more lights it controls.

What is claimed is:

1. A system for controlling one or more lights, the system comprising:
   an interface configured to connect to a junction box;
   at least one remote sensing device separate from and in electrical communication with the interface, the remote sensing device being configured for attachment to a first support structure and comprising:
      a main body comprising a first end and a second end, wherein the first end of the main body is solid except for first and second openings disposed on a surface thereof;
      a first sensor disposed coaxially with and protruding, at least partially, through the first opening;
      a second sensor disposed coaxially with the second opening and recessed within the main body;
      a light pipe disposed to pass through the second opening and configured to transmit light from the second opening to the second sensor;
      a cable configured to connect a standard cable connector of the interface with the at least one remote sensing device, wherein the cable protrudes from the main body through a third opening disposed adjacent to the second end of the main body and formed in a radial surface thereof;
      a first retaining member for positioning on the first end of the main body; and
      a second retaining member for positioning on the second end of the main body;
      wherein the first end and the second end of the main body have at least a first portion and a second portion of external threads, the first portion and the second portion of threads having different thread gauges, the different thread gauges corresponding to thread gauges of the first retaining member and the second retaining member, respectively, such that the first and second retaining members are both rotatably threadable onto the main body over the first end of the main body, and the second retaining member is rotatably threadable onto the external threads of the second end of the main body by rotating each retaining member;
      wherein the first and second retaining members are configured to abut opposing surfaces of the first support structure; and
      wherein the first and second retaining members are adjustable with respect to each other and to the main body, thus enabling an adjustment of the remote sensing device;
   wherein the system is adapted to process information from the remote sensing device for controlling one or more lights.

2. The system of claim 1, wherein the interface comprises an enclosure and a retention feature which is attached to an external face of the enclosure and configured for attachment to a second support structure.

3. The system of claim 1, wherein the sensing device comprises an occupancy sensor.

4. The system of claim 2 wherein the retention feature comprises a substantially cylindrical body, at least one flexible tab radially angled off of a top portion of the substantially cylindrical body, and one or more detents integrated into an edge of the at least one flexible tab.

5. The system of claim 4, wherein there are one or more opposing pairs of flexible tabs and each of the flexible tabs has one or more detents integrated into its respective surface.

6. The system of claim 4, wherein the at least one flexible tab is configured to be displaced towards the substantially cylindrical body with respect to an original resting position, such that the diameter of the retention feature is temporarily smaller than an opening in the second support structure, and the retention feature is configured to fit within the opening in the second support structure and allow the one or more detents to catch onto an edge of the opening and removably secure the retention feature within the opening.

7. The system of claim 1, wherein there are at least two remote sensing devices separate from and in electrical communication with the interface.

8. At least one remote sensing device in electrical communication with an interface and configured for attachment to a first support structure, the at least one remote sensing device comprising:
   a main body comprising a first end and a second end, wherein the first end of the main body is solid except for first and second openings disposed on a surface thereof;

a first sensor disposed coaxially with and protruding, at least partially, through the first opening;

a second sensor disposed coaxially with the second opening and recessed within the main body;

a light pipe disposed to pass through the second opening and configured to transmit light from the second opening to the second sensor;

a cable configured to connect a standard cable connector of the interface with the at least one remote sensing device, wherein the cable protrudes from the main body through a third opening disposed adjacent to the second end of the main body and formed in a radial surface thereof;

a first retaining member for positioning on a first end of the main body; and a second retaining member for positioning on a second end of the main body;

wherein the first end and the second end of the main body have at least a first portion and a second portion of external threads, the first portion and the second portion of threads having different thread gauges, the different thread gauges corresponding to thread gauges of the first retaining member and the second retaining member, respectively, such that the first and second retaining members are both rotatably threadable onto the main body over the first end of the main body, and the second retaining member is rotatably threadable onto the external threads of the second end of the main body by rotating each retaining member;

wherein the first retaining member and the second retaining member are configured to abut opposing surfaces of the first support structure, and wherein the first and second retaining members are adjustable with respect to each other and to the main body, thus enabling an adjustment of the remote sensing device.

9. The remote sensing device of claim 8, wherein an amount of threaded surface area on the first end of the main body differs from the second end of the main body.

10. The remote sensing device of claim 8, comprising one or more of:

a substantially cylindrical inner body which an interior of the substantially cylindrical main body is configured to receive;

a substrate configured for attachment on a rim of the substantially cylindrical inner body;

an occupancy sensor mounted onto a top surface of the substrate; and a lens which covers the sensor.

11. The remote sensing device of claim 8, wherein the remote sensing device is configured to send data to at least one of an external device, interface, and structure.

12. A method for controlling one or more lights using the remote sensing device of claim 8, the method comprising:

securing the remote sensing device in a first support structure by inserting the substantially cylindrical main body through an opening in the first support structure and then rotatably threading the first retaining member and the second retaining member onto the substantially cylindrical main body over the first end thereof, such that a surface of each of the first retaining member and the second retaining member abut the first support structure on opposing sides;

coupling an interface in electrical communication with one or more lights to a second support structure by applying pressure to at least one flexible tab disposed on a retention feature so that the pressure displaces the at least one flexible tab with respect to an original resting position, such that the retention feature fits within an opening in the second support structure; and processing information from the remote sensing device in order to control the one or more lights.

13. The method of claim 12, comprising rotatably adjusting the first retaining member and the second retaining member with respect to the substantially cylindrical main body by rotating each of the retaining members about a positive z-axis.

14. The method of claim 12, wherein the at least one flexible tab comprises at least one detent integrated into an edge of the at least one flexible tab such that the at least one detent can catch on to the opening in the second support structure.

15. The system of claim 1, wherein the first sensor is an occupancy sensor, the second sensor is an ambient light sensor, and the at least one remote sensing device further comprises a substrate on which the ambient light sensor and the occupancy sensor are located.

* * * * *